United States Patent
Kuriki et al.

(10) Patent No.: US 9,196,906 B2
(45) Date of Patent: Nov. 24, 2015

(54) POWER STORAGE DEVICE AND METHOD FOR MANUFACTURING THE SAME

(71) Applicant: SEMICONDUCTOR ENERGY LABORATORY CO., LTD., Atsugi-shi, Kanagawa-ken (JP)

(72) Inventors: Kazutaka Kuriki, Kanagawa (JP); Teppei Oguni, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 331 days.

(21) Appl. No.: 13/792,612

(22) Filed: Mar. 11, 2013

(65) Prior Publication Data

US 2013/0252088 A1   Sep. 26, 2013

(30) Foreign Application Priority Data

Mar. 23, 2012  (JP) ................. 2012-067634

(51) Int. Cl.
| | |
|---|---|
| H01M 4/04 | (2006.01) |
| H01M 10/04 | (2006.01) |
| H01M 4/64 | (2006.01) |
| H01M 4/134 | (2010.01) |
| H01M 4/66 | (2006.01) |
| H01M 4/70 | (2006.01) |
| H01G 11/66 | (2013.01) |
| H01M 10/052 | (2010.01) |
| H01M 10/058 | (2010.01) |

(52) U.S. Cl.
CPC ............... *H01M 4/64* (2013.01); *H01G 11/66* (2013.01); *H01M 4/04* (2013.01); *H01M 4/134* (2013.01); *H01M 4/661* (2013.01); *H01M 4/70* (2013.01); *H01M 10/052* (2013.01); *H01M 10/058* (2013.01); *Y02E 60/122* (2013.01); *Y02E 60/13* (2013.01); *Y10T 29/49108* (2015.01)

(58) Field of Classification Search
CPC ......... H01M 2/20; H01M 4/04; H01M 4/386; H01M 4/661; H01M 10/04
USPC ................ 429/211, 218.1; 29/623.1–623.5
See application file for complete search history.

(56) References Cited

U.S. PATENT DOCUMENTS

| | | | |
|---|---|---|---|
| 7,045,438 B2 | 5/2006 | Yamazaki et al. | |
| 7,534,700 B2 | 5/2009 | Yamazaki et al. | |
| 8,390,019 B2 | 3/2013 | Yamazaki et al. | |

(Continued)

FOREIGN PATENT DOCUMENTS

| | | |
|---|---|---|
| JP | 2003-109773 | 4/2003 |
| JP | 2007-123081 | 5/2007 |

OTHER PUBLICATIONS

Jung et al., "Novel Nanostructured Si anode Behavior on Nanorod Array Polymer Substrate," 222nd ECS Meeting Abstract, Oct. 7, 2012, p. 868, ECS.

*Primary Examiner* — Kenneth Douyette
*Assistant Examiner* — James Lee
(74) *Attorney, Agent, or Firm* — Nixon Peabody LLP; Jeffrey L. Costellia

(57) ABSTRACT

A power storage device is reduced in weight. A metal sheet serving as a negative electrode current collector is separated and another negative electrode current collector is formed. For example, through the step of forming silicon serving as a negative electrode active material layer over a titanium sheet and then performing heating, the titanium sheet can be separated. Then, another negative electrode current collector with a thickness of more than or equal to 10 nm and less than or equal to 1 µm is formed. Thus, light weight of the power storage device can be achieved.

18 Claims, 23 Drawing Sheets

(56) References Cited

U.S. PATENT DOCUMENTS

| | | |
|---|---|---|
| 2003/0025118 A1 | 2/2003 | Yamazaki et al. |
| 2006/0027817 A1 | 2/2006 | Yamazaki et al. |
| 2009/0302339 A1 | 12/2009 | Yamazaki et al. |
| 2011/0159365 A1* | 6/2011 | Loveness et al. .......... 429/218.1 |
| 2013/0071762 A1 | 3/2013 | Tajima et al. |
| 2013/0134051 A1 | 5/2013 | Takahashi et al. |
| 2013/0252089 A1 | 9/2013 | Kuriki |
| 2013/0273405 A1 | 10/2013 | Takahashi et al. |

* cited by examiner

Point3

Point4

Point5

POWER STORAGE DEVICE AND METHOD FOR MANUFACTURING THE SAME

BACKGROUND OF THE INVENTION

1. Field of the Invention

The present invention relates to a power storage device that can be reduced in weight and a method for manufacturing the power storage device.

2. Description of the Related Art

Portable information terminals such as mobile phones and portable game machines are equipped with power storage devices. As such power storage devices, lithium secondary batteries have been used.

Although portable information terminals have been reduced in weight, the reduction has been unsatisfactory. Portable information terminals equipped with light-weight power storage devices can reduce the weight of the portable information terminals.

A solid-state secondary battery is a kind of power storage device (see Patent Document 1). The solid-state secondary battery includes a solid electrolyte such as an inorganic solid electrolyte and an organic solid electrolyte.

In the technical field of display devices which is different from that of power storage devices, a method for transferring a layer to be separated to a plastic substrate is described (Patent Document 2). Patent Document 2 discloses the following method: a nitride layer is formed over a substrate, an oxide layer is formed over the nitride layer, and film stress of the oxide layer is made different from film stress of the nitride layer to enable peeling by a physical means.

REFERENCE

[Patent Document 1] Japanese Published Patent Application No. 2007-123081
[Patent Document 2] Japanese Published Patent Application No. 2003-109773

SUMMARY OF THE INVENTION

In Patent Document 1, quartz glass is used, and weight reduction is not described.

It has been difficult to apply the method including the steps of forming a nitride layer over a substrate and forming an oxide layer over the nitride layer, which is disclosed in Patent Document 2, to power storage devices because a nitride layer and an oxide layer is not included in the power storage devices.

In view of the above, the present invention provides a power storage device that can be reduced in weight and a method for manufacturing the power storage device.

One feature of the present invention is a power storage device in which a current collector is separated and another current collector is formed and a method for manufacturing the power storage device. A current collector in a foil shape can be referred to as a metal sheet.

Note that timing of separation of a current collector can be selected from the following timings.

(1) After a layer containing a negative electrode active material (a negative electrode active material layer) is formed, a current collector (e.g., a metal sheet) is separated.
(2) After a layer containing an electrolyte (e.g., an electrolyte layer) is formed over a negative electrode active material layer, a current collector (e.g., a metal sheet) is separated.
(3) After an electrolyte layer and a layer containing a positive electrode active material (positive electrode active material layer) are formed over a negative electrode active material layer, a current collector (e.g., a metal sheet) is separated.
(4) After an electrolyte layer, a positive electrode active material layer, and a positive electrode current collector are formed over a negative electrode active material layer, a current collector (e.g., a metal sheet) is separated.
(5) After an electrolyte layer, a positive electrode active material layer, and a positive electrode current collector are formed over a negative electrode active material layer and a protective film is formed to cover the electrolyte layer, the positive electrode active material layer, and the positive electrode current collector, a current collector (e.g., a metal sheet) is separated.

As described above, the separation can be performed with any timing, and the separation of the metal sheet enables weight reduction. To achieve light weight, at least part of the metal sheet is separated, and the metal sheet is not need to be entirely separated.

Further, separation of a metal sheet enables a flexible power storage device to be provided. A metal sheet used as a current collector has difficulty in bending because of having a certain level of hardness so as to be carried in a manufacturing process. It is also possible to provide a flexible power storage device by separating a metal sheet as described above.

To have a flexible structure, a metal sheet of a power storage device is at least partly separated, preferably entirely separated. Moreover, after the metal sheet is separated, a protective film is provided so that the power storage device can be protected. As the protective film, a flexible film (also referred to as a flexible substrate) can be used. The flexible substrate has greater flexibility than the metal sheet, and thus can be bent and curved; therefore, the flexibility of the power storage device provided with the flexible substrate can be kept at the same level as that of the power storage device from which the metal sheet has been separated. In addition, since the flexible substrate has weight lighter than that of the metal sheet, the power storage device can be reduced in weight even when transferred to the flexible substrate.

In the case of using silicon as a negative electrode active material, a material which reacts with the silicon is used for a current collector. Examples of a metal element which forms silicide by reacting with silicon include zirconium, titanium, hafnium, vanadium, niobium, tantalum, chromium, molybdenum, tungsten, cobalt, nickel, and the like. A current collector containing such a metal element can be used. A current collector which contains the metal element and is formed in a foil shape can be referred to as a metal sheet. As the metal sheet, a titanium sheet, an aluminum sheet, a nickel sheet, or the like can be used.

When silicon is used as the negative electrode active material of the power storage device and a titanium sheet is used as the metal sheet, a silicon film is formed over the titanium sheet. The silicon film may be amorphous or polycrystalline. A reaction layer (which is titanium silicide in some cases) is formed by performing heating at a temperature higher than or equal to 400° C. at the same time as or after the formation of the silicon film. The silicon film and the titanium sheet can be separated in the vicinity of the reaction layer as a boundary.

Note that when the reaction layer is formed, a low density layer is formed in the silicon film in some cases. Since silicon is used in the formation of the reaction layer, silicon diffuses to the reaction layer, and thus the density of silicon is decreased in the low density layer. When physical force is applied for separation in this state, the separation occurs in many cases at the interface between the low density layer and the reaction layer.

Note that the negative electrode current collector is removed by the separation of the titanium sheet; therefore, another negative electrode current collector needs to be formed. This negative electrode current collector can be thinner than the metal sheet, and can have a thickness of more than or equal to 10 nm and less than or equal to 1 µm.

Further, with the use of the technique of separation and transfer of the present invention, a power storage device in which stacks each including a negative electrode current collector, a negative electrode active material layer, an electrolyte layer, a positive electrode active material layer, and a positive electrode current collector and having a function of storing power are stacked can be provided. For example, when a plurality of stacks which is described above is prepared and the stacks are referred to as a first stack and a second stack, the power storage device has a structure in which the second stack is stacked over the first stack. In the stacks, positive electrode layers and negative electrode layers are stacked in the following order, for example. (1) In the first stack, the positive electrode layer and the negative electrode layer are stacked in this order, and in the second stack, the positive electrode layer and the negative electrode layer are stacked in this order. (2) In the first stack, the positive electrode layer and the negative electrode layer are stacked in this order, and in the second stack, the negative electrode layer and the positive electrode layer are stacked in this order. In the case of (2), only one negative electrode current collector can be provided between the first stack and the second stack because the negative electrode layers are in contact with each other.

The power storage device in which the stacks are stacked in such a manner can be provided.

Further, with the use of the technique of separation and transfer, a plurality of negative electrode active material layers can be arranged in one plane. For example, a stack in which an electrolyte layer, a positive electrode active material layer, and a positive electrode current collector are formed is prepared, and a plurality of negative electrode active material layers is arranged over the stack. The plurality of negative electrode active material layers can be arranged in a grid form or a hexagon form. At this time, one negative electrode current collector can be shared by the plurality of negative electrode active material layers.

The power storage device of one embodiment of the present invention may include a solid electrolyte layer as the electrolyte layer. Even in the case of a flexible power storage device, the solid electrolyte layer is preferably used because an electrolyte is more difficult to leak than that in a secondary battery including a non-aqueous electrolyte solution. For example, an organic solid electrolyte layer can fit the flexible power storage device in a curved state. Therefore, the power storage device can be used in a band portion of a wrist watch type electronic appliance or the like.

According to one embodiment of the present invention, a novel power storage device can be provided. In the novel power storage device, a current collector is separated; thus, light weight can be achieved. Such a power storage device can include another current collector, that is, a negative electrode current collector which is different from a negative electrode current collector which is used in formation of a negative electrode active material layer.

After the separation, the power storage device can be transferred to a flexible substrate. The power storage device including the flexible substrate can be bent and can have flexibility.

An increase in market share of such a power storage device is expected in portable information terminals and appliances other than the portable information terminals.

BRIEF DESCRIPTION OF THE DRAWINGS

FIGS. 11A, 11B-1, 11B-2, and 11B-3 are views of a first experimental result.

DETAILED DESCRIPTION OF THE INVENTION

Embodiments and examples are described below with reference to drawings. However, the embodiments and examples can be implemented with various modes. It will be readily appreciated by those skilled in the art that modes and details can be changed in various ways without departing from the spirit and scope of the present invention. Thus, the present invention should not be interpreted as being limited to the following description of the embodiments and examples.

Embodiment 1

In this embodiment, a power storage device from which a metal sheet that is a current collector is separated and a method for manufacturing the power storage device are described. Further, the case where the current collector is separated after a negative electrode active material layer, a solid electrolyte layer, a positive electrode active material layer, and a positive electrode current collector are formed is described.

Note that in this embodiment, a flexible substrate is used as a protective film, and the power storage device from which the metal sheet is separated is transferred over the flexible substrate. Note that although a titanium sheet is used as the metal sheet in the following description, an aluminum sheet or the like can be used as described above.

Figure 1A:
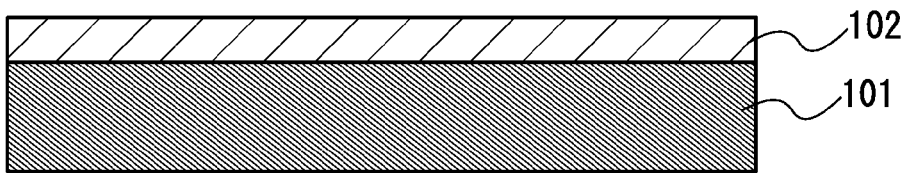
FIGS. 1A to 1D are views of a power storage device of the present invention and a method for manufacturing the power storage device.

As illustrated in FIG. 1A, a silicon film 102 is formed over a titanium sheet 101. The titanium sheet 101 which can be used as the metal sheet has a thickness of more than or equal to 10 μm and less than or equal to 1000 μm. The silicon film 102 which can serve as a negative electrode active material can be formed by plasma CVD, low-pressure CVD, evaporation, sputtering, or the like and has a thickness of more than or equal to 50 nm and less than or equal to 10 μm. As the negative electrode active material, a material other than silicon can be used as long as the material can absorb and release lithium ions.

Examples of carrier ions which can be used instead of lithium ions include alkali-metal ions such as sodium ions and potassium ions; alkaline-earth metal ions such as calcium ions, strontium ions, and barium ions; beryllium ions; magnesium ions; and the like. As the negative electrode active material, a material than can absorb and release such ions may also be used.

Figure 1B:
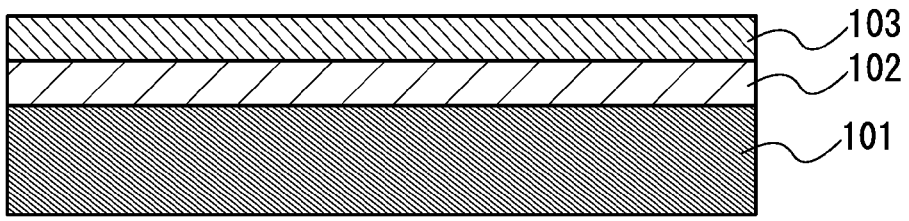

As illustrated in FIG. 1B, an electrolyte layer 103 is formed. A solid electrolyte layer such as an organic solid electrolyte layer or an inorganic solid electrolyte layer can be used as the electrolyte layer. Such electrolyte layers can have film shapes. The solid electrolyte layer preferably has an ion conductivity of $10^{-5}$ S/cm to $10^{-1}$ S/cm at 20° C. This is because the solid electrolyte layer transports charge carriers between a negative electrode and a positive electrode. In the case of the organic solid electrolyte layer, a high molecular material containing an electrolyte salt can be used. As the electrolyte salt, for example, $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, $Li(C_2F_5SO_2)_3C$, or the like can be used. One kind of the electrolyte salts or two or more kinds of the electrolyte salts which are mixed may be used. Examples of the high molecular material include polyvinylidene fluoride, a vinylidene fluoride based polymer such as a vinylidene fluoride-hexafluoropropylene copolymer, acrylonitrile based polymers such as an acrylonitrile-methyl methacrylate copolymer and an acrylonitrile-methyl acrylate copolymer, polyethylene oxide, and the like. These high molecular materials may each be a gel-like high molecular material containing an electrolyte solution or a high molecular material containing an electrolyte salt. In the case of a flexible organic solid electrolyte layer, the thickness there of can be more than or equal to 70 nm and less than or equal to 1.5 μm. In the case of the inorganic solid electrolyte layer, for example, LiPON (lithium phosphate doped with nitrogen), $Li_2O$, $Li_2CO_3$, $Li_2MoO_4$, $Li_3PO_4$, $Li_3VO_4$, $Li_4SiO_4$, $LLT(La_{2/3-x}Li_{3x}TiO_3)$, $LLZ(Li_7La_3Zr_2O_{12})$, or the like can be used. When having lower flexibility than the organic solid electrolyte layer, the inorganic solid electrolyte layer is preferably made into a thin film, and the thickness thereof may be more than or equal to 50 nm and less than or equal to 1 μm.

Figure 1C:
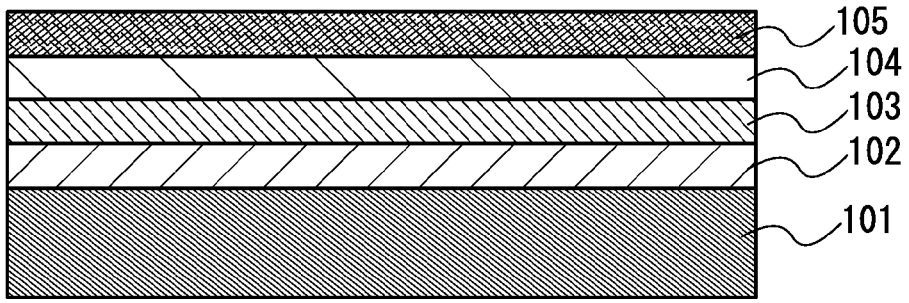

As illustrated in FIG. 1C, a positive electrode active material layer 104 and a positive electrode current collector 105 are formed in this order. For the positive electrode active material layer 104, a compound such as $LiFeO_2$, $LiCoO_2$, $LiNiO_2$, $LiMn_2O_4$, $V_2O_5$, $Cr_2O_5$, or $MnO_2$ can be used. The material of the positive electrode current collector 105 is not limited as long as it has conductivity. Examples of the material include aluminum, stainless steel, nickel, copper, iron, titanium, and the like. An alloy containing any of such materials as its main component can also be used. The positive electrode current collector can be formed as a thin film by sputtering, CVD, or evaporation. For example, the thickness is more than or equal to 10 nm and less than or equal to 10 μm. A positive electrode layer including the positive electrode active material layer and the positive electrode current collector is described in detail in the following embodiment.

Figure 1D:
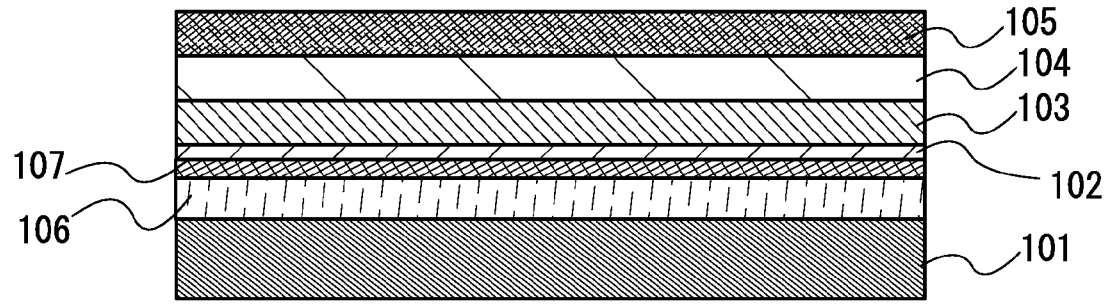

After the positive electrode current collector 105 is formed, heating is performed at a temperature higher than or equal to 400° C. and lower than or equal to 800° C., and a reaction layer 106 is formed at the boundary between the silicon film 102 and the titanium sheet 101 as illustrated in FIG. 1D. At this time, a low density layer 107 is formed in the silicon film 102 in some cases. As a result of using silicon for forming the reaction layer 106, the density of silicon probably becomes lower than that of the silicon film 102 which is not subjected to the heating yet. That is, the low density layer is a region in the silicon film, which has decreased density of silicon due to diffusion of silicon into the reaction layer in the formation of the reaction layer. In such a low density layer 107, a small space (void) is formed in some cases. In the reaction layer 106, particulate reaction products are aggregated in some cases; consequently, a small space (void) is formed on the low density layer 107 side in some cases. Note that the reaction layer 106 becomes a titanium silicide layer in some cases, depending on the composition ratio of titanium and silicon.

Heating performed in forming a silicon film may be used for the step of performing heating to form the reaction layer 106 (heat treatment step). Since heating is performed at higher than or equal to 400° C. and lower than or equal to 800° C. when the silicon film is formed by plasma CVD, reduced-pressure CVD, evaporation, sputtering, or the like, the reaction layer may be formed through the heating.

Figure 2A:
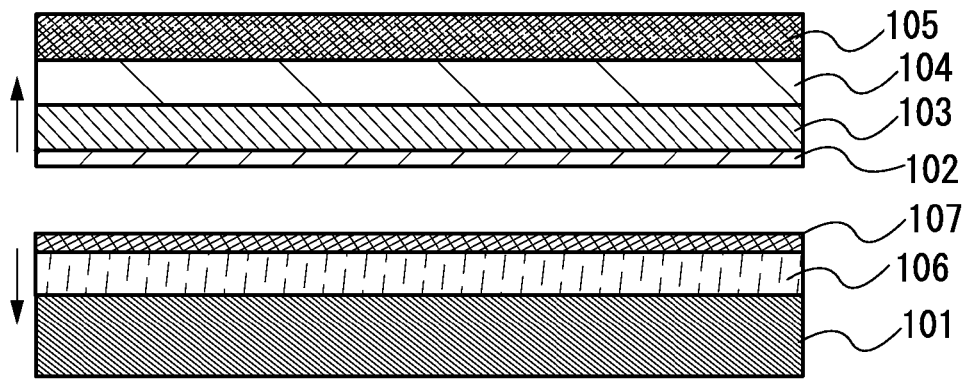
FIGS. 2A to 2C are views of a power storage device of the present invention and a method for manufacturing the power storage device.

As illustrated in FIG. 2A, the titanium sheet 101 can be separated from the silicon film 102. FIG. 2A illustrates the case where the low density layer 107 is also formed when the reaction layer 106 is formed, and separation is performed along the low density layer 107 as a boundary. That is, separation is performed inside the low density layer 107, at the interface between the low density layer 107 and the reaction layer 106, or at the interface between the low density layer 107 and the silicon film 102. Alternatively, separation is performed at the interfaces.

Note that the titanium sheet 101 which has been subjected to separation can be used again.

Figure 2B:
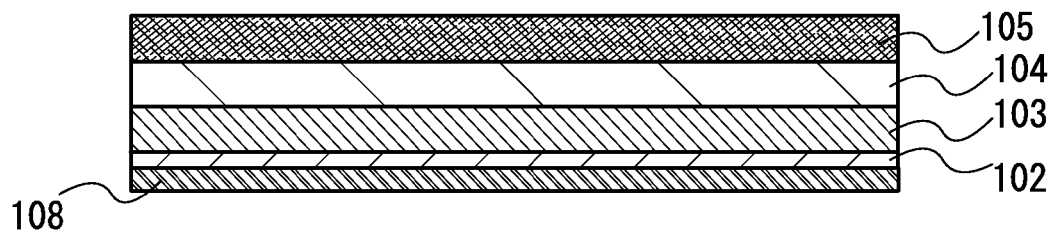

As illustrated in FIG. 2B, another negative electrode current collector 108 is formed on the silicon film 102 side. The material of the negative electrode current collector 108 is not limited as long as it has conductivity. Examples of the materials include aluminum, stainless steel, nickel, copper, tin, niobium, iron, titanium, and the like. An alloy containing any of such materials as its main component can also be used. Lithium titanate can be given as an example of an alloy of titanium. $Nb_2O_5$ that is an oxide of niobium may also be used. The negative electrode current collector can be formed as a thin film by sputtering, CVD, or evaporation. For example, the thickness is more than or equal to 10 nm and less than or equal to 1 μm. With the use of such a negative electrode current collector, an adhesive is not necessarily provided between the silicon film 102 and the negative electrode current collector 108.

Such a negative electrode current collector 108 is a current collector different from the titanium sheet 101 that is the above-described current collector. The different current collector includes a current collector formed by a manufacturing method different from that of the above-described current collector, such as sputtering. The negative electrode current collector 108 formed by sputtering or the like has the above-described thickness and is thinner than the titanium sheet.

Further, part of the negative electrode current collector 108 may react with the negative electrode active material as long as it is not separated after the reaction. For example, in the case where the negative electrode active material is silicon, lithium titanate which is described above can be selected as the negative electrode current collector 108. Lithium titanate is one of materials which react with silicon and are not separated after the reaction. Titanium is a material used among lithium titanate and the titanium sheet.

Figure 2C:
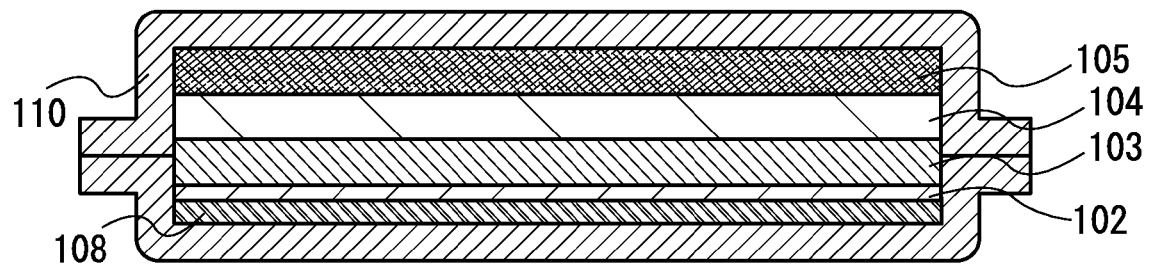

As illustrated in FIG. 2C, the positive electrode current collector 105, the positive electrode active material layer 104, the electrolyte layer 103, the silicon film 102, and the negative electrode current collector 108 can be covered with a protective film 110. The protective film has a function of protecting the power storage device. A thin film containing an organic material, an inorganic material, or a metal material can be used as the protective film. Alternatively, a substrate containing any of such materials can be used as the protective film. For example, a plastic substrate or an aluminum substrate can be given. Being in a thin film form, these substrates can be referred to as a sheet, a film, or a flexible substrate. Further alternatively, a laminate film for laminating can be used as the protective film. Although the laminate film is provided with an adhesive, the laminate film can cover and protect the power storage device as long as the adhesive is provided at least in a region where the laminate films overlap with each other. Further, the protective film may have a stacked-layer structure, and a protective film with a sealing function of preventing entry of an impurity or water to the laminate film may be stacked, for example.

It is apparent that even a power storage device covered with such a protective film can be reduced in weight because a thick titanium sheet is separated. In addition, as described in this embodiment, an active material layer, a current collector, or a solid electrolyte layer can be formed by a thin film formation method such as sputtering or CVD. Consequently, the power storage device can be further reduced in weight and thickness. Moreover, the power storage device described in this embodiment can have increased flexibility, and thus can have a variety of shapes.

Note that in the field of a semiconductor, titanium silicide is formed by depositing titanium over a silicon film in order to reduce the resistance of a source region and a drain region in some cases. In such a case, titanium silicide is not used for separation. That is, the titanium silicide is different from a titanium silicide layer formed when a silicon film is formed over a titanium sheet in the present invention.

Embodiment 2

In this embodiment, an example of employing a flexible substrate as a protective film is described. That is, a method for manufacturing a power storage device by which a negative electrode active material layer or the like is transferred to the flexible substrate. Further, the case where separation is performed after a negative electrode active material layer, a solid electrolyte layer, a positive electrode active material layer, a positive electrode current collector, and a flexible substrate are formed is described.

Figure 3A:
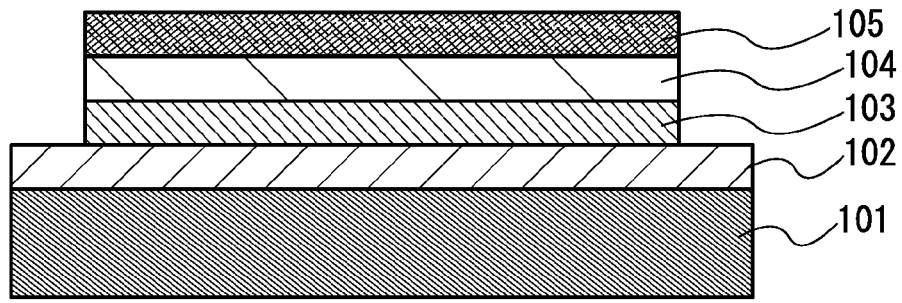
FIGS. 3A to 3C are views of a power storage device of the present invention and a method for manufacturing the power storage device.

FIG. 3A illustrates a structure similar to that in FIG. 1C. That is, as in Embodiment 1, the silicon film 102 is formed over the titanium sheet 101, the electrolyte layer 103 is formed, the positive electrode active material layer 104 is formed, and the positive electrode current collector 105 is formed. Note that the widths of the electrolyte layer 103, the positive electrode active material layer 104, and the positive electrode current collector 105 are shorter than the width of the silicon film 102, and part of the silicon film 102 is exposed.

Figure 3B:
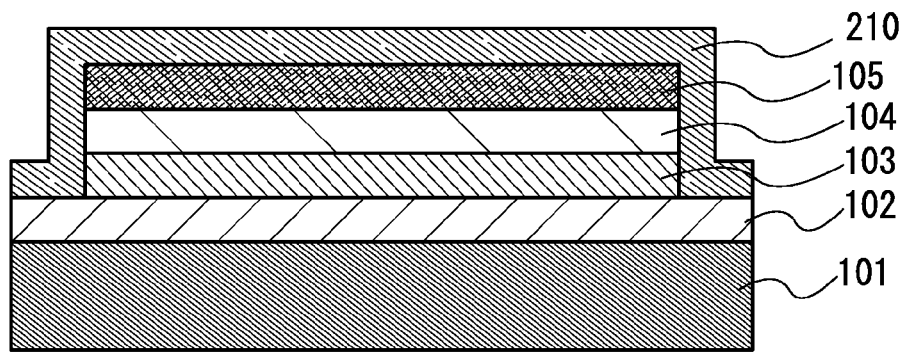

As illustrated in FIG. 3B, a protective film 210 is formed. The protective film 210 can be formed using a film containing an inorganic material, for example, a film containing silicon such as a film containing silicon oxide or a film containing silicon nitride. The protective film 210 can also be formed using a film containing an organic material, for example, a film containing polyimide, a film containing acrylic, or the like. Alternatively, the protective film 210 can be formed using a film containing a metal material such as aluminum. Further alternatively, the protective film 210 can be formed using a stacked-layer which includes a film containing an organic material and a film containing silicon or a metal. In addition, with a film containing an organic material, the protective film 210 can be flat. The protective film 210 can be formed by CVD, sputtering, or coating.

Figure 19A:
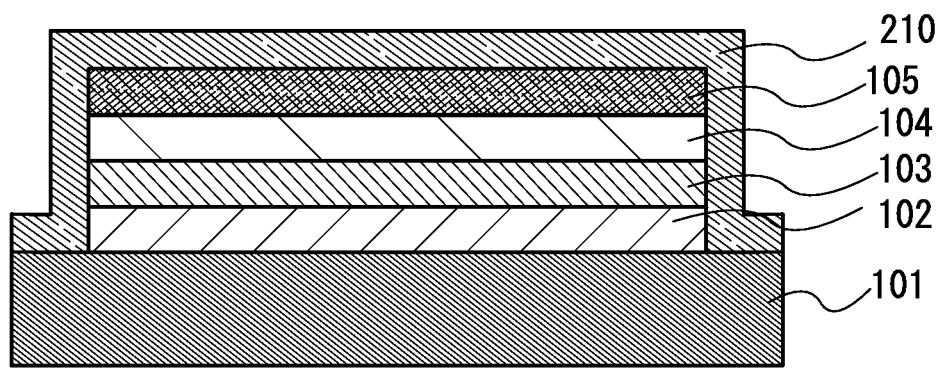
FIGS. 19A and 19B are views of a power storage device of the present invention and a method for manufacturing the power storage device.

Further, the electrolyte layer 103, the positive electrode active material layer 104, and the positive electrode current collector 105 have the widths at least shorter than the width of the titanium sheet 101. Thus, part of the titanium sheet 101 may be exposed as illustrated in FIG. 19A. In this case, the protective film 210 can also cover side surfaces of the silicon film 102.

Figure 3C:
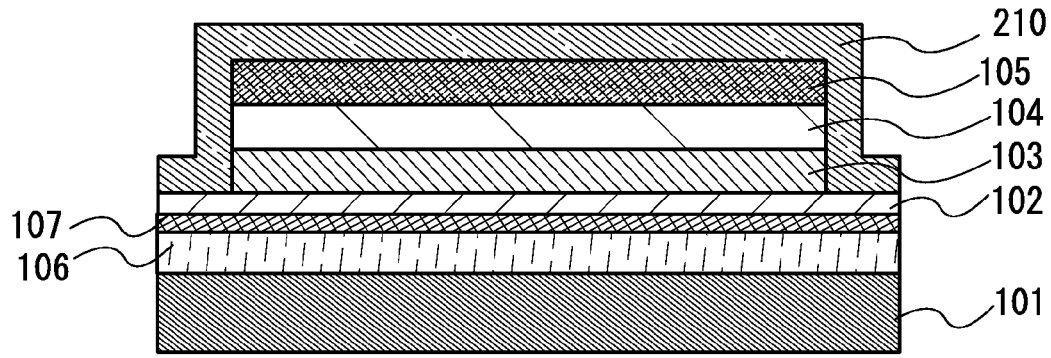

Then, heating is performed at higher than or equal to 400° C. and lower than or equal to 800° C. Thus, the reaction layer 106 is formed at the boundary between the silicon film 102 and the titanium sheet 101 as illustrated in FIG. 3C. At this time, the low density layer 107 is formed in the silicon film 102 in some cases. As a result of using silicon for forming the reaction layer 106, the density of silicon probably becomes low. In the low density layer 107, a small space (void) is formed in some cases. In the reaction layer 106, particulate reaction products are aggregated in some cases; consequently, a small space (void) is formed in the reaction layer 106 in some cases.

Figure 19B:
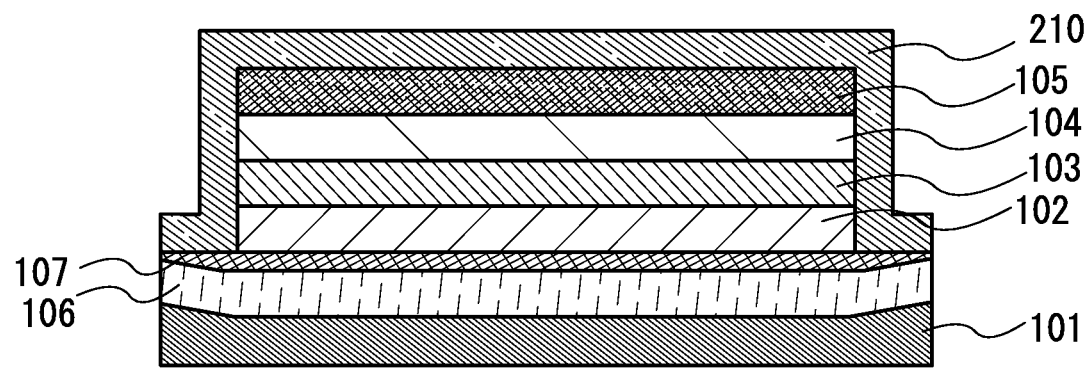

In FIG. 19A, it is probable that when heating is performed at higher than or equal to 400° C. and lower than or equal to 800° C., a region where the reaction layer 106 is formed is gradually reduced in a region where the titanium sheet 101 and the silicon film 102 do not overlap with each other and the low density layer 107 is formed along the reaction layer 106 as illustrated in FIG. 19B. In the case where a film containing silicon is used as the protective film 210, silicon in the protective film 210 reacts with the titanium sheet 101 in some cases because the protective film 210 is in contact with the titanium sheet 101 outside the silicon film 102.

Figure 4A:
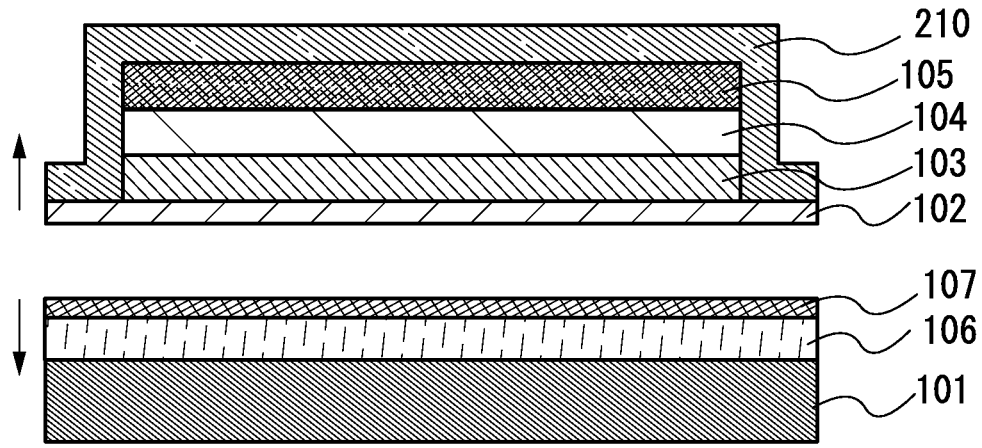
FIGS. 4A to 4C are views of a power storage device of the present invention and a method for manufacturing the power storage device.

As illustrated in FIG. 4A, at least the titanium sheet 101 can be separated from the silicon film 102 with the use of the state of the low density layer 107 and the reaction layer 106. The separation is performed along the low density layer 107 as a boundary. That is, separation is performed inside the low density layer 107, at the interface between the low density layer 107 and the reaction layer 106, or at the interface between the low density layer 107 and the silicon film 102.

Note that when the separation is performed in a structure illustrated in FIG. 19B, the side surfaces of the silicon film 102 can be covered with the protective film 210.

Figure 4B:
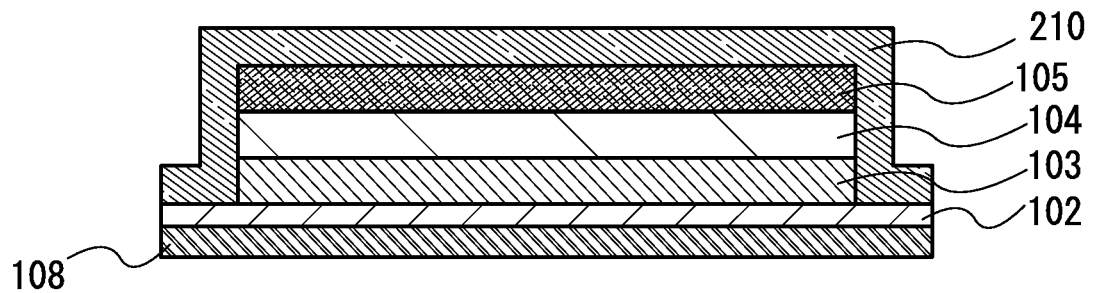

As illustrated in FIG. 4B, the negative electrode current collector 108 is formed on the silicon film 102 side. The material of the negative electrode current collector 108 is not limited as long as it has conductivity, and specific examples thereof are similar to those described in Embodiment 1.

Figure 4C:
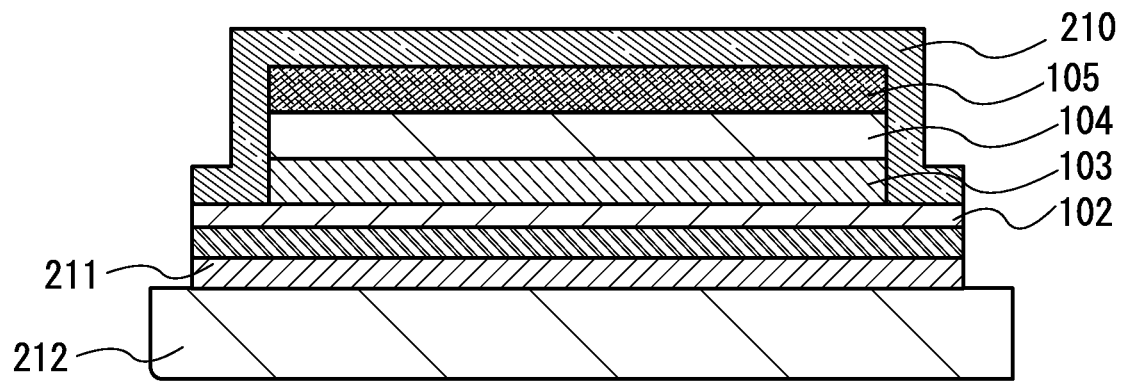

As illustrated in FIG. 4C, the negative electrode current collector 108 and the like are fixed on a flexible substrate 212 with the use of an adhesive 211. In such a manner, the negative electrode active material layer and the like can be transferred to the flexible substrate 212. As the flexible substrate 212, a substrate containing an organic material, such as a resin substrate, can be used. The power storage device can be reduced in weight and can have flexibility.

Embodiment 3

In this embodiment, a method for manufacturing a power storage device by which a negative electrode active material layer is transferred to a stack in which a positive electrode current collector, a positive electrode active material layer, a solid electrolyte layer, and the like are formed is described. That is, the case were the timing of separation is different from those described in the above embodiments is described.

Figure 5A:
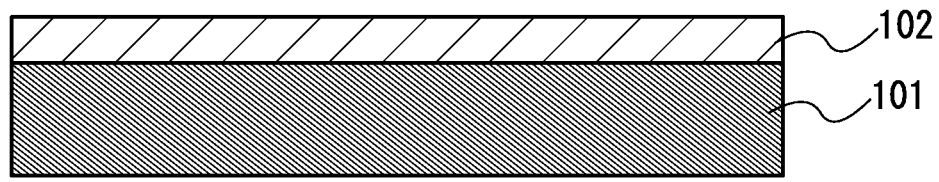
FIGS. 5A to 5C are views of a power storage device of the present invention and a method for manufacturing the power storage device.

FIG. 5A illustrates a structure similar to that in FIG. 1A. That is, the silicon film 102 is formed over the titanium sheet 101 as in Embodiment 1.

Figure 5B:
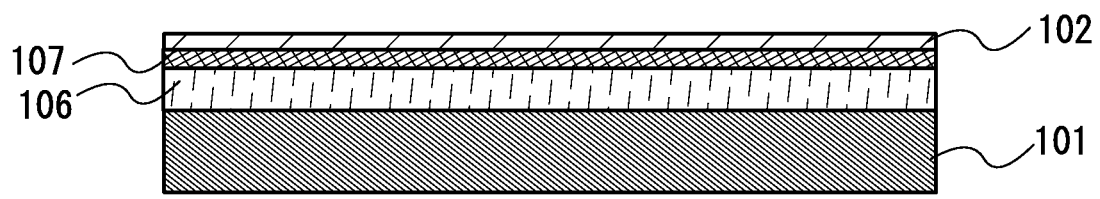

Then, heating is performed at higher than or equal to 400° C. and lower than or equal to 800° C. Thus, the reaction layer 106 is formed at the boundary between the silicon film 102 and the titanium sheet 101 as illustrated in FIG. 5B. At this time, the low density layer 107 is formed in the silicon film 102. In the low density layer 107, a small space (void) is formed in some cases. In the reaction layer 106, particulate reaction products are aggregated in some cases; consequently, a small space (void) is formed in the reaction layer 106 in some cases.

Figure 5C:
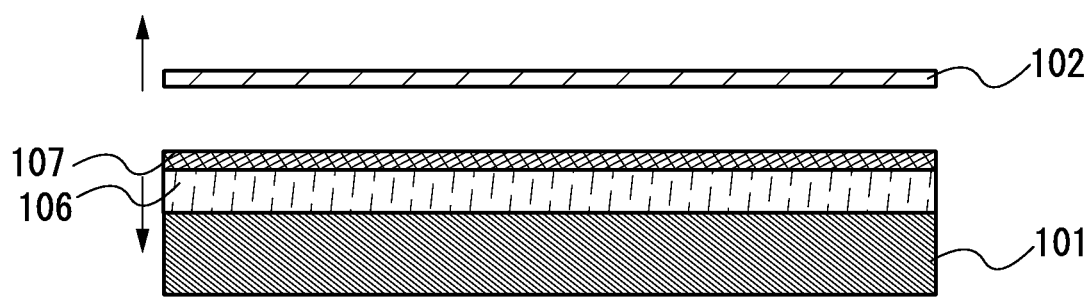

As illustrated in FIG. 5C, at least the titanium sheet 101 can be separated from the silicon film 102 with the use of the state of the low density layer 107 and the reaction layer 106. The separation is performed along the low density layer 107 as a boundary. That is, separation is performed inside the low density layer 107, at the interface between the low density layer 107 and the reaction layer 106, or at the interface between the low density layer 107 and the silicon film 102. Thus, the separated silicon film 102 can be obtained.

Figure 6A:
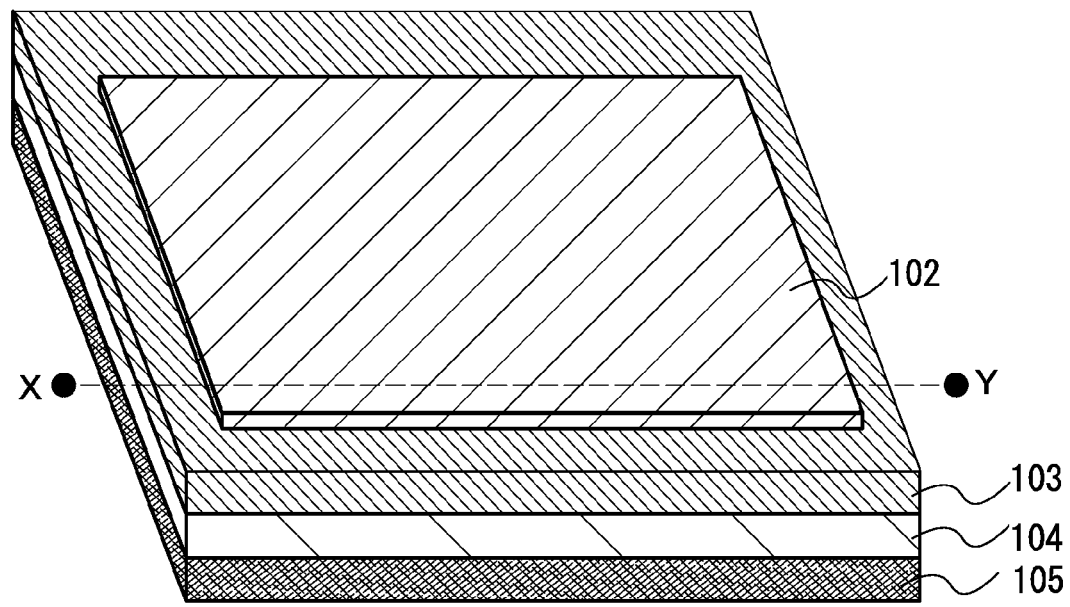
FIGS. 6A and 6B are views of a power storage device of the present invention and a method for manufacturing the power storage device.

As illustrated in FIG. 6A, the silicon film is transferred to a stack in which the electrolyte layer 103, the positive electrode active material layer 104, and the positive electrode current collector 105 are stacked. FIG. 6A is a perspective view. A gelled electrolyte layer is preferably used as the electrolyte layer. This is because the adhesive property of the gelled electrolyte layer can be utilized to hold the silicon film 102 in contact with the electrolyte layer.

Figure 6B:
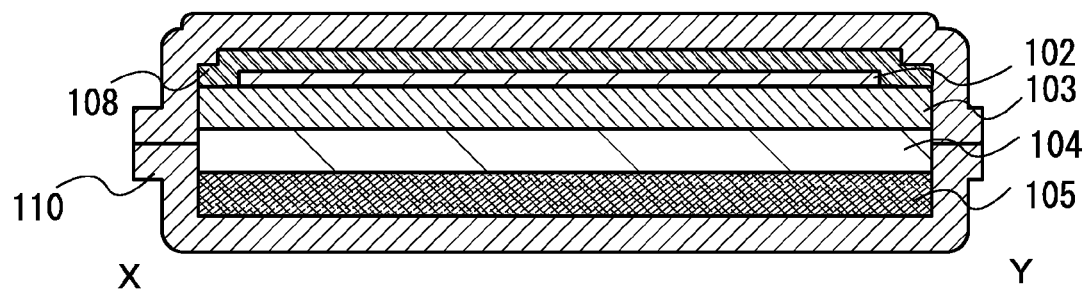

FIG. 6B is a cross-sectional view taken along the line X-Y in FIG. 6A. In FIG. 6B, the negative electrode current collector 108 is formed to cover the silicon film 102. Then, for example, the stack to which the silicon film is transferred and over which the negative electrode current collector 108 is formed is covered with a laminate film serving as the protective film 110, whereby a power storage device can be manufactured.

Figure 7A:
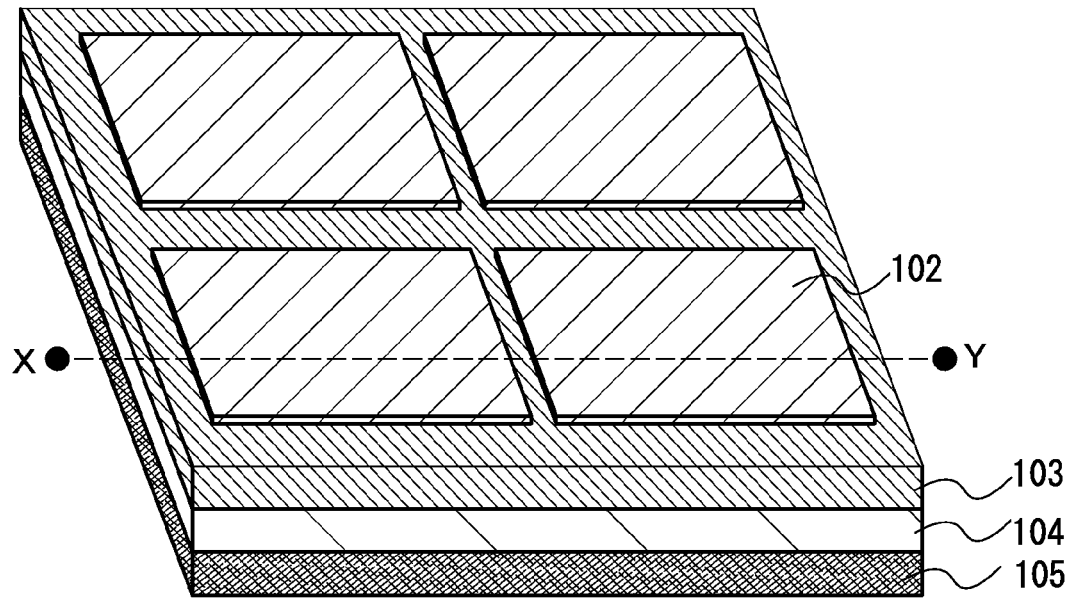
FIGS. 7A and 7B are views of a power storage device of the present invention and a method for manufacturing the power storage device.

Another embodiment of the method for manufacturing a power storage device is described with reference to FIGS. 7A and 7B. FIG. 7A is a perspective view, and a plurality of silicon films 102 is transferred to a stack in which the electrolyte layer 103, the positive electrode active material layer 104, and the current collector 105 are stacked.

Figure 7B:
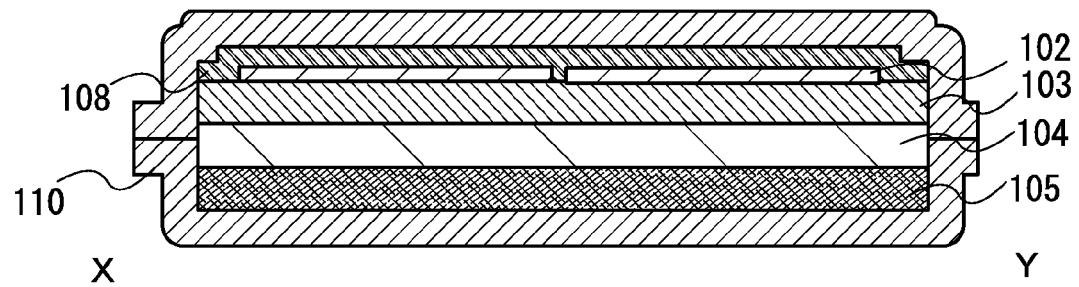

FIG. 7B is a cross-sectional view taken along the line X-Y in FIG. 7A. In FIG. 7B, the negative electrode current collector 108 is formed to cover the plurality of silicon films 102. Then, for example, the stack to which the silicon films are transferred and over which the negative electrode current collector 108 is formed is covered with a laminate film serving as the protective film 110, whereby a power storage device can be manufactured. Arrangement of the plurality of silicon films 102 can provide a region where the silicon film 102 is not provided. This enables higher flexibility than that of the power storage device having the structure illustrated in FIGS. 6A and 6B because of the region where the silicon film 102 is not provided. As a result, a cylindrical power storage device can be manufactured.

As described above, value such as higher flexibility can be added to the power storage device by selecting the timing of separation.

Embodiment 4

In this embodiment, the case where a roller is used so that force thereof is utilized to lead separation is described.

Figure 23A:
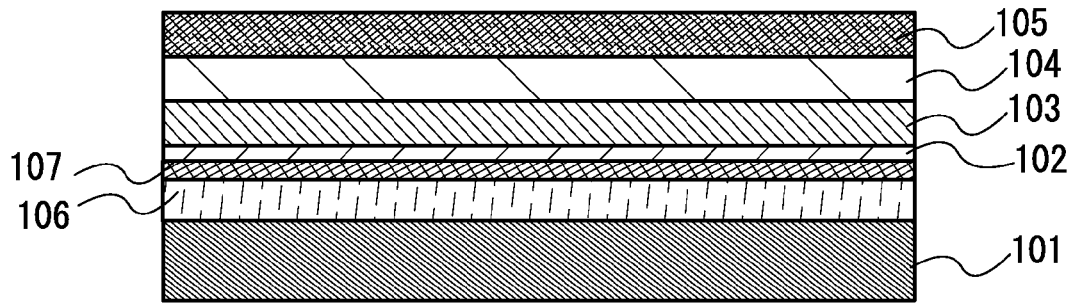
FIGS. 23A to 23C are views of a power storage device of the present invention and a method for manufacturing the power storage device.

In FIG. 23A, as illustrated in FIG. 1D, the titanium sheet 101, the silicon film 102, the electrolyte layer 103, the positive electrode active material layer 104, and the positive electrode current collector 105 are formed, and then heating is performed at higher than or equal to 400° C. and lower than or equal to 800° C. to form the reaction layer 106 and the low density layer 107.

Figure 23B:
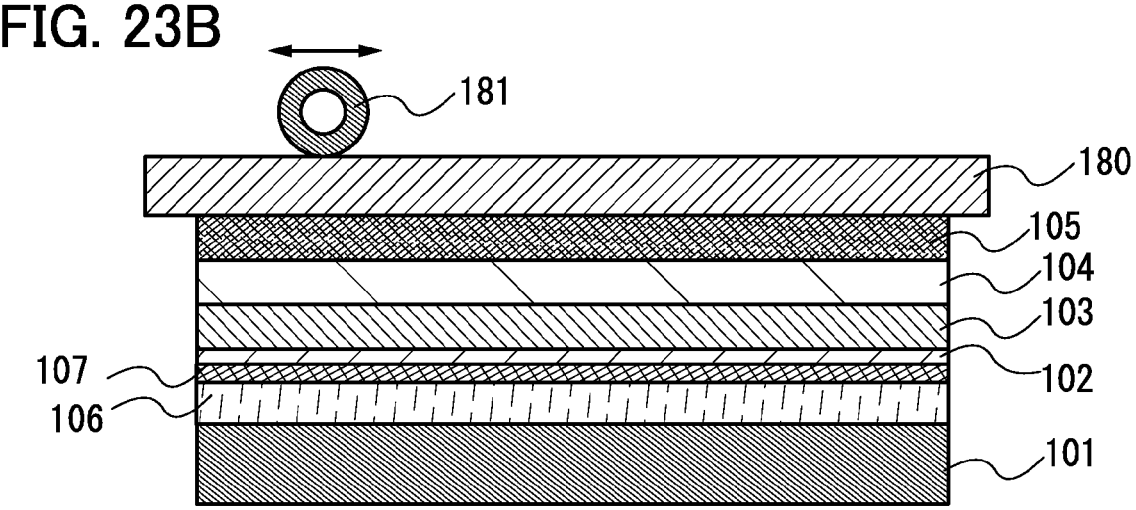

As a protective film, a substrate containing an organic material, such as a resin substrate, is used. As illustrated in FIG. 23B, a resin substrate 180 is attached over the positive electrode current collector 105. An adhesive may be provided between the positive electrode current collector 105 and the resin substrate 180. A roller 181 moves over the resin substrate 180. Force is applied from the roller so that the positive electrode current collector 105 and the resin substrate 180 are attached to each other. Moreover, the force from the roller can lead separation or the roller can apply a physical force for separation inside the low density layer 107, at the interface between the low density layer 107 and the reaction layer 106, or at the interface between the low density layer 107 and the silicon film 102.

Figure 23C:
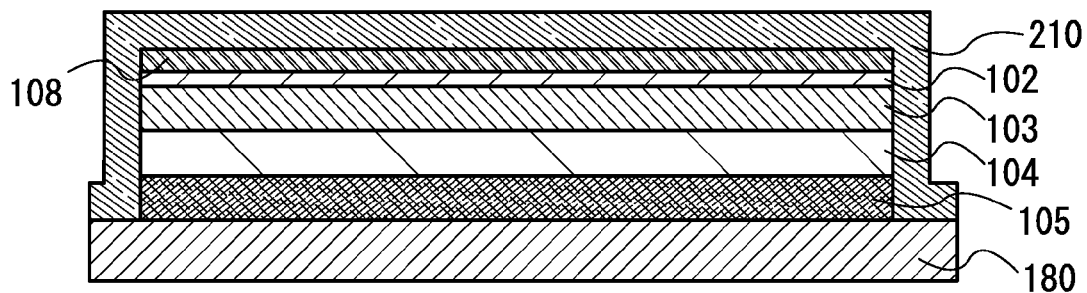

After the separation, the negative electrode current collector 108 is formed and the protective film 210 is formed as illustrated in FIG. 23C. The protective film 210 can be formed using a film containing an inorganic material, for example, a film containing silicon such as a film containing silicon oxide or a film containing silicon nitride. The protective film 210 can also be formed using a film containing an organic material, for example, a film containing polyimide, a film containing acrylic, or the like. Alternatively, the protective film 210 can be formed using a film containing a metal material such as aluminum. Further alternatively, the protective film 210 can be formed using a stack which includes a film containing an organic material and a film containing silicon or a metal. In addition, with a film containing an organic material, the protective film 210 can be flat. The protective film 210 can be formed by CVD, sputtering, or coating.

In such a manner, a power storage device covered with the protective film 210 can be provided. The protective film 210 can be in contact with the periphery of the resin substrate 180.

Embodiment 5

In this embodiment, a structure of a power storage device in which a resin is used for a protective film and the power storage device is sandwiched between resins is described.

Figure 8A:
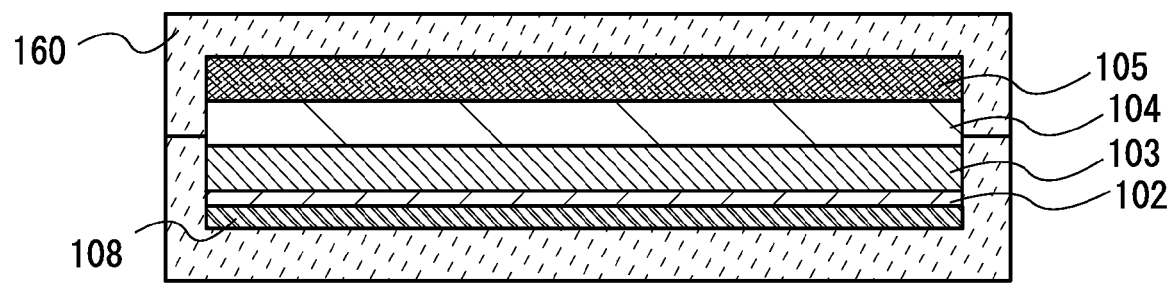
FIGS. 8A and 8B are views of a power storage device of the present invention and a method for manufacturing the power storage device.
Figure 8B:
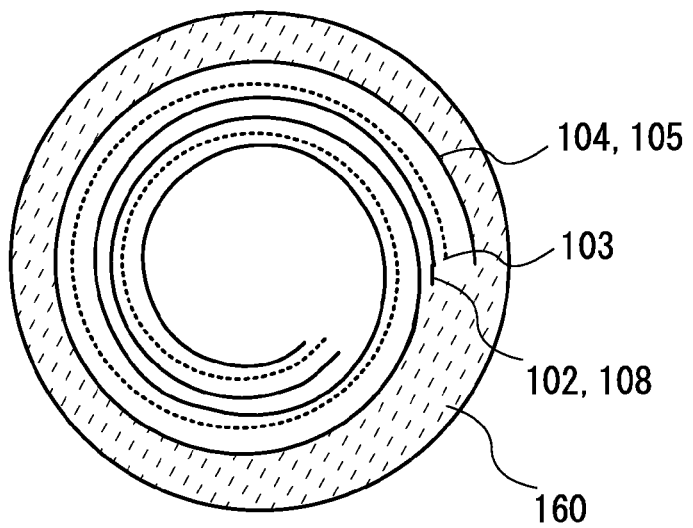

FIGS. 8A and 8B are cross-sectional views illustrating the case where the power storage device described in Embodiment 1 is not covered with a laminate film but sandwiched between resins 160. FIG. 8A illustrates a stack in a film form. The stack is surrounded by the resins 160, so that a cubic or rectangular power storage device can be provided. The stack in the film form can be rolled and sandwiched between the resins 160 to provide a cylindrical power storage device. Note that FIG. 8B is a cross-sectional view of the cylindrical power storage device.

Figure 9A:
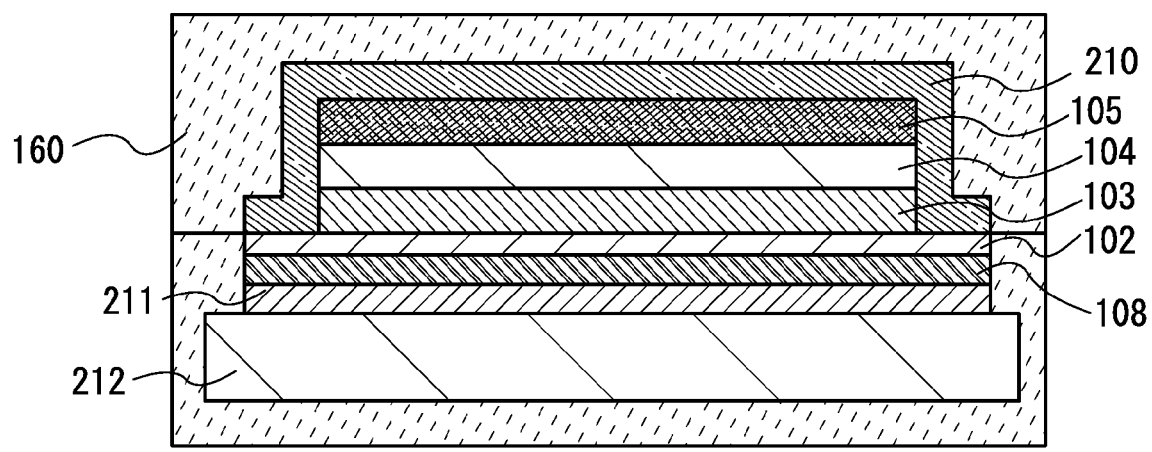
FIGS. 9A and 9B are views of a power storage device of the present invention and a method for manufacturing the power storage device.
Figure 9B:
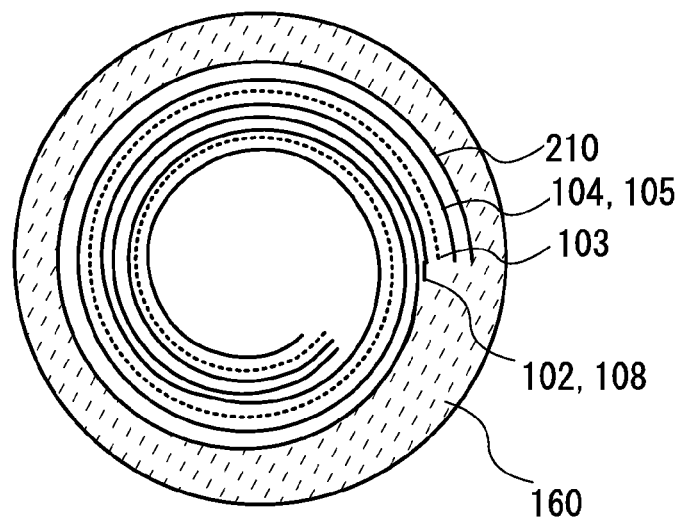

In the power storage device described in Embodiment 2, the negative electrode active material layer and the like may be sandwiched between the resins 160 even after transferred to the flexible substrate. FIGS. 9A and 9B are cross-sectional views of the power storage device. FIG. 9A illustrates a stack in a film form. The stack is surrounded by the resins 160, so that a cubic or rectangular power storage device can be provided. The stack in the film form can be rolled and sandwiched between the resins 160 to provide a cylindrical power storage device. Note that FIG. 9B is a cross-sectional view of the cylindrical power storage device.

Figure 10A:
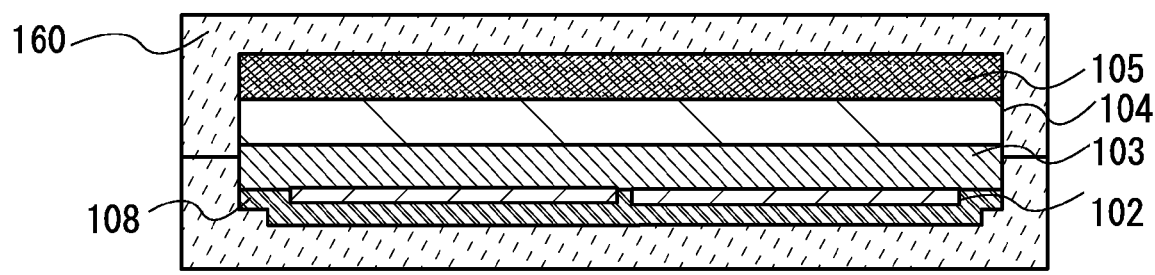
FIGS. 10A and 10B are views of a power storage device of the present invention and a method for manufacturing the power storage device.
Figure 10B:
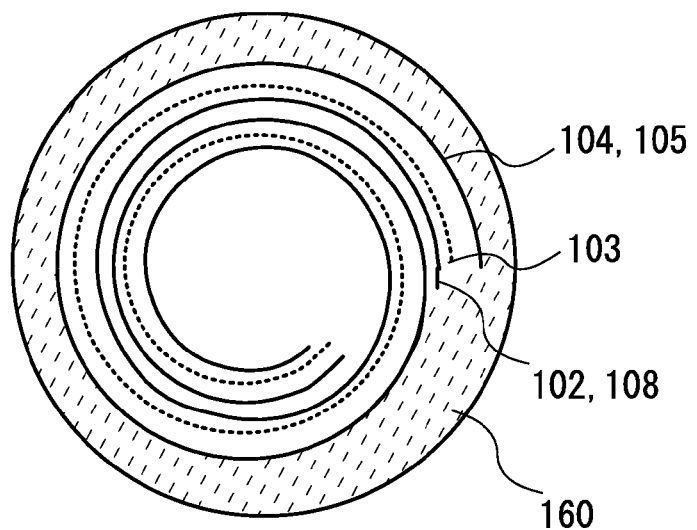

FIGS. 10A and 10B are cross-sectional views illustrating the case where the power storage device described in Embodiment 3 which includes the plurality of silicon films 102 is not covered with a laminate film but sandwiched between resins 160. FIG. 10A illustrates a stack in a film form. The stack is surrounded by the resins 160, so that a cubic or rectangular power storage device can be provided. In FIG. 10B, the stack in the film form can be rolled and surrounded by the resins 160 to provide a cylindrical power storage device. Note that description of the structure of the power storage device described in Embodiment 3 which includes the single silicon film 102 is skipped because it is similar to those in FIGS. 8A and 8B.

In such a manner, a power storage device surrounded by a resin can be provided. The power storage device is less likely to break when it is dropped.

Embodiment 6

In this embodiment, a power storage device having a stacked-layer structure is described.

Figure 14A:
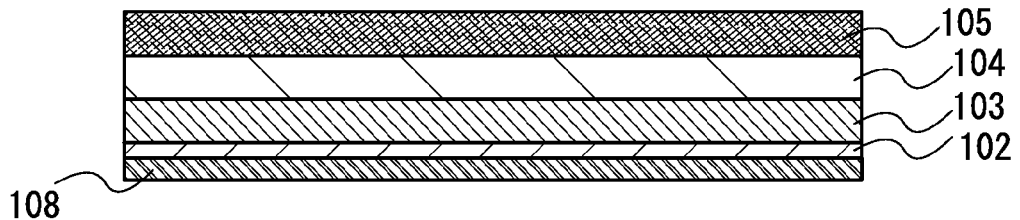
FIGS. 14A to 14C are views of a power storage device of the present invention and a method for manufacturing the power storage device.

FIG. 14A illustrates a stack in which the negative electrode current collector 108, the silicon film 102 serving as a negative electrode active material layer, the electrolyte layer 103, the positive electrode active material layer 104, and the positive electrode current collector 105, which are illustrated in FIG. 2B are stacked.

Figure 14B:
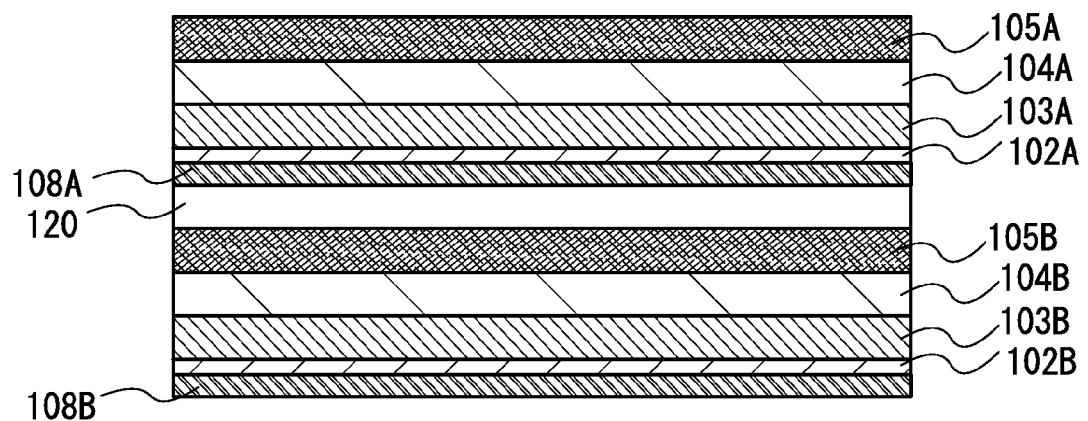

FIG. 14B illustrates the case of stacking the above stacks. That is, from the top of FIG. 14B, a positive electrode current collector 105A, a positive electrode active material layer 104A, an electrolyte layer 103A, a negative electrode active material layer 102A, a negative electrode current collector 108A, an insulating film 120, a positive electrode current collector 105B, a positive electrode active material layer 104B, an electrolyte layer 103B, a negative electrode active material layer 102B, and a negative electrode current collector 108B are provided. In other words, a stacked-layer structure in which a positive electrode layer, a negative electrode layer, a positive electrode layer, and a negative electrode layer are stacked in this order from the top is provided. For the insulating film 120, a material similar to that of the electrolyte layer can be used.

When the stacked-layer structure is formed in the above manner, the insulating film 120 is provided so that the positive electrode current collector 105B and the negative electrode current collector 108A are not in contact with each other. In the insulating film 120, a wiring for the positive electrode layer and a wiring for the negative electrode layer are formed. The layout of the wirings can be decided depending on whether the stacks are connected in series or parallel. Then, contact holes are formed in the insulating film 120, and a conductive material is formed in regions including the contact holes; thus, the wirings can be formed.

In stead of the insulating film 120 provided with the wirings, an anisotropic conductive adhesive and a flexible printed substrate may be provided. An anisotropic conductive adhesive and a flexible printed substrate for the positive electrode current collector 105B are prepared, and an anisotropic conductive adhesive and a flexible printed substrate for the negative electrode current collector 108A are prepared. The anisotropic conductive adhesive contains an adhesive for fixing electrodes and conductive particles dispersed uniformly. The flexible printed substrate is provided with a wiring. The positive electrode current collector can be electrically connected to the wiring through the conductive particles. Similarly, the negative electrode current collector can be electrically connected to the wiring through the conductive particles.

Figure 14C:
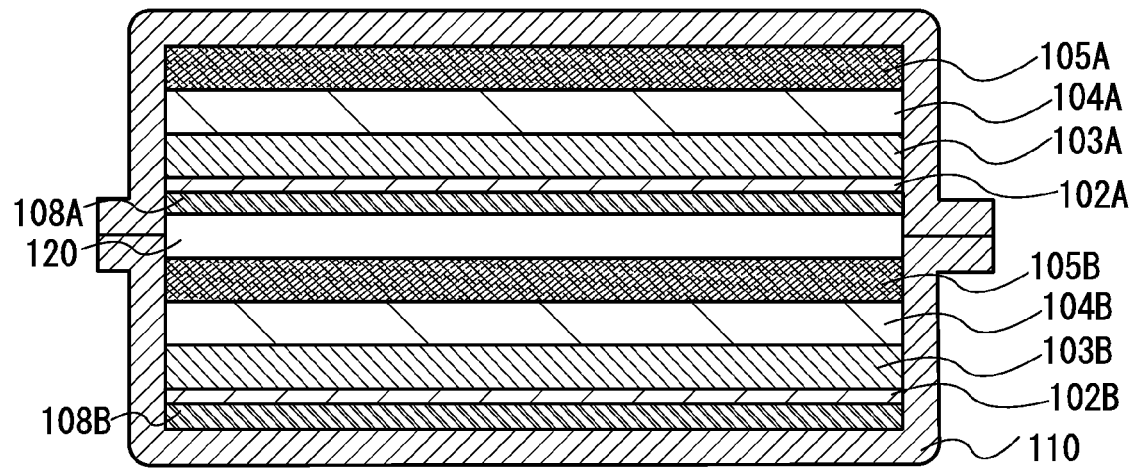

As illustrated in FIG. 14C, a power storage device covered with a laminate film can be provided.

Figure 18A:
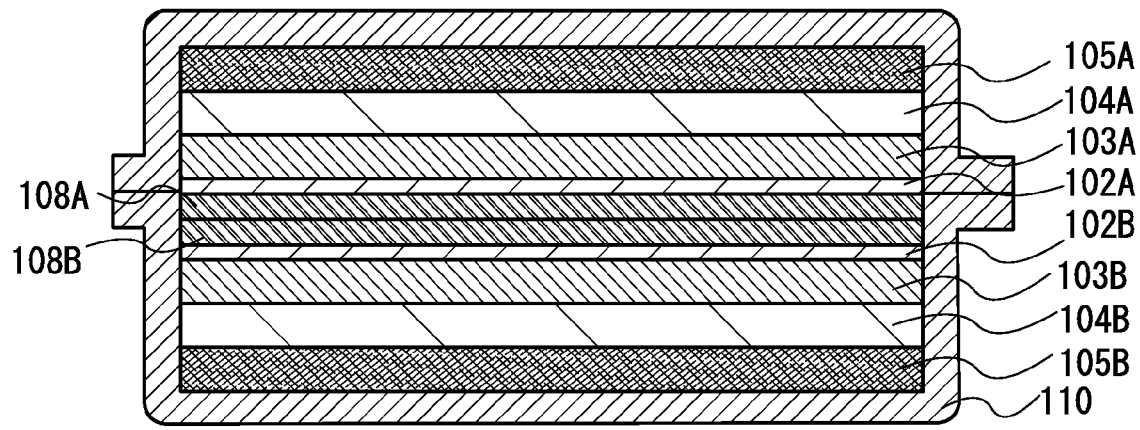
FIGS. 18A and 18B are views of power storage devices of the present invention and methods for manufacturing the power storage devices.

Note that the stacking order is not limited to the following order: a positive electrode layer, a negative electrode layer, a positive electrode layer, and a negative electrode layer from the top. As illustrated in FIG. 18A, a positive electrode layer, a negative electrode layer, a negative electrode layer, and a positive electrode layer may be stacked in this order from the top of the drawing. That is, the positive electrode current collector 105A, the positive electrode active material layer 104A, the electrolyte layer 103A, the negative electrode active material layer 102A, the negative electrode current collector 108A, the negative electrode current collector 108B, the negative electrode active material layer 102B, the electrolyte layer 103B, the positive electrode active material layer 104B, and the positive electrode current collector 105B may be stacked in this order from the top.

The insulating film 120 does not need to be provided in the stacked-layer structure in which the negative electrodes are close to each other as illustrated in FIG. 18A. Moreover, one negative electrode current collector can be used as the negative electrode current collector 108A and the negative electrode current collector 108B which are stacked in contact with each other.

Figure 18B:
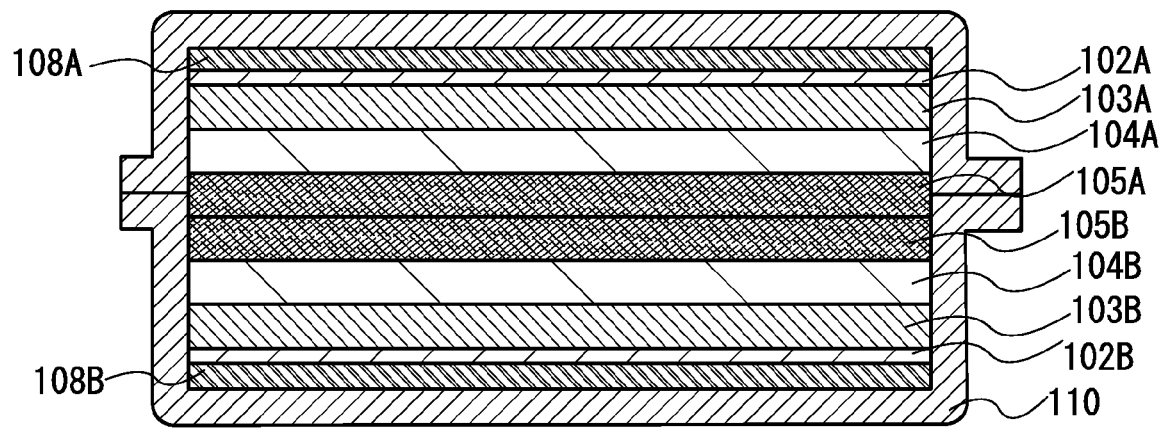

Further, as illustrated in FIG. 18B, the following order may be employed: a negative electrode layer, a positive electrode layer, a positive electrode layer, and a negative electrode layer from the top. That is, the negative electrode current collector 108A, the negative electrode active material layer 102A, the electrolyte layer 103A, the positive electrode active material layer 104A, the positive electrode current collector 105A, the positive electrode current collector 105B, the positive electrode active material layer 104B, the electrolyte layer 103B, the negative electrode active material layer 102B, and the negative electrode current collector 108B may be stacked in this order from the top.

The insulating film 120 does not need to be provided in the stacked-layer structure in which the positive electrodes are close to each other as illustrated in FIG. 18B. Moreover, one positive electrode current collector can be used as the positive electrode current collector 105A and the positive electrode current collector 105B which are stacked in contact with each other.

Although the stacked-layer structure of the two stacks is described as an example in this embodiment, a stacked-layer structure of three or more stacks can be formed by providing the insulating film 120 as appropriate.

As described in this embodiment, an active material layer, a current collector, and an electrolyte layer can be formed in a film form; thus, there is no increase in thickness of a stack thereof.

Embodiment 7

In this embodiment, a structure of the positive electrode layer of the power storage devices described in the above embodiments and a method for manufacturing the positive electrode layer are described in detail.

<Positive Electrode Layer and Method for Manufacturing Positive Electrode Layer>

Figure 15A:
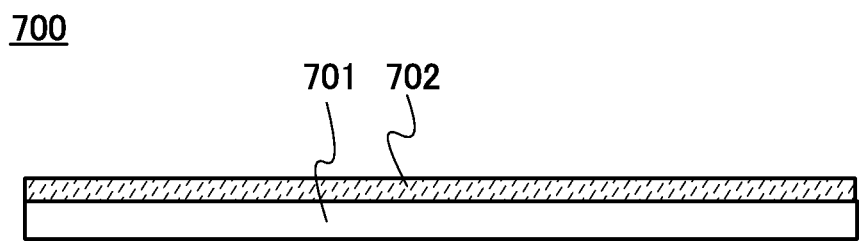
FIGS. 15A to 15C are views of a positive electrode layer of a power storage device of the present invention.

A positive electrode layer and a method for manufacturing the positive electrode layer are described. FIG. 15A is a cross-sectional view of a positive electrode 700. In the positive electrode 700, a positive electrode active material layer 702 containing a positive electrode active material and a positive electrode current collector 701 supporting the positive electrode active material layer 702 are formed.

The positive electrode active material layer 702 contains a positive electrode active material. As the positive electrode active material, a material that can insert and extract lithium ions can be used. For example, a lithium-containing composite oxide with an olivine crystal structure, a layered rock-salt crystal structure, or a spinel crystal structure can be given.

As the lithium-containing composite oxide with an olivine crystal structure, a composite oxide represented by a general formula $LiMPO_4$ (M is one or more of Fe(II), Mn(II), Co(II), and Ni(II)) can be given. Typical examples of the general formula $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), $LiFe_fNi_gCo_hMn_iPO_4$ (f+g+h+i≤1, 0<f<1, 0<g<1, 0<h<1, and 0<i<1), and the like.

$LiFePO_4$ is particularly preferable because it meets requirements with balance for a positive electrode active material, such as safety, stability, high capacity density, high potential, and the existence of lithium ions that can be extracted in initial oxidation (charging).

Examples of the lithium-containing composite oxide with a layered rock-salt crystal structure include lithium cobalt oxide ($LiCoO_2$); $LiNiO_2$; $LiMnO_2$; $Li_2MnO_3$; an NiCo-based lithium-containing composite oxide (a general formula thereof is $LiNi_xCo_{1-x}O_2$ (0<x<1)) such as $LiNi_{0.8}Co_{0.2}O_2$; an NiMn-based lithium-containing composite oxide (a general formula thereof is $LiNi_xMn_{1-x}O_2$ (0<x<1)) such as $LiNi_{0.5}Mn_{0.5}O_2$; and an NiMnCo-based lithium-containing composite oxide (also referred to as NMC, and a general formula thereof is $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$—$LiMO_2$ (M=Co, Ni, or Mn), and the like can be given.

$LiCoO_2$ is particularly preferable because it has high capacity, is more stable in the air than $LiNiO_2$, and is more thermally stable than $LiNiO_2$, for example.

Examples of the lithium-containing composite oxide with a spinel crystal structure include $LiMn_2O_4$, $Li_{i+x}Mn_{2-x}O_4$, $Li(MnAl)_2O_4$, $LiMn_{1.5}Ni_{0.5}O_4$, and the like.

A lithium-containing composite oxide with a spinel crystal structure including manganese, such as $LiMn_2O_4$, is preferably mixed with a small amount of lithium nickel oxide (e.g., $LiNiO_2$ or $LiNi_{1-x}MO_2$ (M=Co, Al, or the like)), in which case elution of manganese and decomposition of an electrolyte solution are suppressed, for example.

As the positive electrode active material, a composite oxide represented by a general formula $Li_{(2-j)}MSiO_4$ (M is one or more of Fe(II), Mn(II), Co(II), and Ni(II); 0≤j≤2) can be used. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), $Li_{(2-j)}Fe_rNi_sCo_tMn_uSiO_4$ (r+s+t+u≤1, 0<r<1, 0<s<1, 0<t<1, and 0<u<1), and the like.

Further, as the positive electrode active material, a nasicon compound represented by a general formula $A_xM_2(XO_4)_3$ (A=Li, Na, or Mg; M=Fe, Mn, Ti, V, Nb, or Al; and X=S, P, Mo, W, As, or Si) can be used. Examples of the nasicon compound include $Fe_2(MnO_4)_3$, $Fe_2(SO_4)_3$, $Li_3Fe_2(PO_4)_3$, and the like. Further alternatively, as the positive electrode active material, a compound represented by a general formula $Li_2MPO_4F$, $Li_2MP_2O_7$, or $Li_5MO_4$ (M=Fe or Mn); perovskite fluoride such as $NaF_3$ or $FeF_3$; metal chalcogenide such as $TiS_2$ or $MoS_2$ (sulfide, selenide, or telluride); a lithium-containing composite oxide with an inverse spinel crystal structure such as $LiMVO_4$; a vanadium oxide based material (e.g., $V_2O_5$, $V_6O_{13}$, or $LiV_3O_8$); a manganese oxide based material; an organic sulfur based material; or the like can be used.

In the case where carrier ions are alkali metal ions other than lithium ions, alkaline-earth metal ions, beryllium ions, or magnesium ions, the positive electrode active material layer 702 may contain, instead of lithium in the lithium compound and the lithium-containing composite oxide, an alkali metal (e.g., sodium or potassium), an alkaline-earth metal (e.g., calcium, strontium, or barium), beryllium, or magnesium.

The positive electrode current collector 701 can be formed using a material having high conductivity such as a metal typified by stainless steel, gold, platinum, zinc, iron, aluminum, or titanium, or an alloy thereof. Alternatively, the positive electrode current collector 701 can be formed using an aluminum alloy to which an element which improves heat resistance, such as silicon, titanium, neodymium, scandium, or molybdenum, is added. The positive electrode current collector 701 can have a foil-like shape, a plate-like shape (sheet-like shape), a net-like shape, a punching-metal shape, an expanded-metal shape, or the like, as appropriate.

The positive electrode active material layer 702 is not necessarily formed in contact with the positive electrode current collector 701. Between the positive electrode current collector 701 and the positive electrode active material layer 702, any of the following functional layers may be formed using a conductive material such as a metal: an adhesive layer for the purpose of improving adhesiveness between the positive electrode current collector 701 and the positive electrode active material layer 702, a planarization layer for reducing unevenness of the surface of the positive electrode current collector 701, a heat radiation layer for radiating heat, and a stress relaxation layer for relieving stress of the positive electrode current collector 701 or the positive electrode active material layer 702.

Figure 15B:

FIG. 15B is a plan view of the positive electrode active material layer 702 containing particulate positive electrode active materials 703 and graphenes 704 each covering and at least partly surrounding part of the positive electrode active materials 703. The different graphenes 704 cover surfaces of part of the positive electrode active materials 703. The positive electrode active materials 703 may be partly exposed.

Graphene is, in a narrow sense, a lateral layer of graphite, i.e., a carbon layer in which six-membered rings each composed of carbon atoms are connected in the planar direction, and in other words, graphene refers to a one-atom-thick sheet of carbon molecules having $\pi$ bonds. In particular, a stack of 2 or more and 100 or less carbon layers, which is referred to as multilayer graphene in some cases, is also included in the category of graphene. Graphene contains oxygen at a concentration higher than or equal to 3 atomic % and lower than or equal to 10 atomic %.

Graphene is chemically stable and has favorable electric characteristics. Graphene has high conductivity because six-membered rings each composed of carbon atoms are connected in the planar direction. That is, graphene has high conductivity in the planar direction. Graphene has a sheet-like shape and a gap is provided between stacked graphene layers in a direction parallel to the plane, so that ions can transfer in the gap. However, the transfer of ions in the direction perpendicular to the graphene layers is difficult.

The size of the particle of the positive electrode active material 703 is preferably greater than or equal to 20 nm and less than or equal to 100 nm. Note that the size of the particle of the positive electrode active material 703 is preferably smaller because electrons transfer in the positive electrode active materials 703.

Although sufficient characteristics can be obtained even when the surfaces of the positive electrode active materials 703 are not covered with a graphite layer, it is preferable to use the positive electrode active materials 703 covered with a graphite layer, in which case hopping of carrier ions occurs between the positive electrode active materials 703, so that current flows.

Figure 15C:
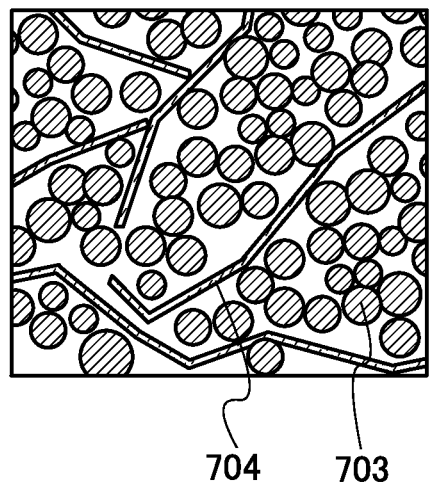

FIG. 15C is a cross-sectional view of part of the positive electrode active material layer 702 in FIG. 15B. The positive electrode active material layer 702 contains the positive electrode active materials 703 and the graphenes 704 each covering part of the positive electrode active materials 703. The graphenes 704 are observed to have linear shapes in the cross-sectional view. Part of the positive electrode active materials is at least partly surrounded with one graphene or a plurality of graphenes. That is, part of the positive electrode active materials exists within one graphene or a plurality of graphenes. Note that the graphene has a bag-like shape, and part of the positive electrode active materials is at least partly surrounded with the bag-like portion in some cases. In addition, part of the positive electrode active materials is not covered with the graphenes and exposed in some cases.

The desired thickness of the positive electrode active material layer 702 is determined in the range of 20 μm to 100 μm. It is preferable to adjust the thickness of the positive electrode active material layer 702 as appropriate so that cracks and separation do not occur.

Note that the positive electrode active material layer 702 may contain a known conductive additive, for example, acetylene black particles having a volume 0.1 to 10 times as large as that of the graphene or carbon particles such as carbon nanofibers having a one-dimensional expansion.

As an example of the positive electrode active material 703, a material whose volume is expanded by occlusion of ions serving as carriers is given. When such a material is used, the positive electrode active material layer gets vulnerable and is partly collapsed by charge and discharge, which results in lower reliability of a power storage device in some cases. However, even when the volume of the positive electrode active material expands due to charge and discharge, the graphene partly covers the periphery of the positive electrode active material, which allows prevention of dispersion of the positive electrode active material and the breakage of the positive electrode active material layer. That is to say, the graphene has a function of maintaining the bond between the positive electrode active materials even when the volume of the positive electrode active materials fluctuates by charge and discharge.

The graphene 704 is in contact with the plurality of particulate positive electrode active materials 703 and serves also as a conductive additive. Further, the graphene 704 has a function of holding the positive electrode active materials 703 capable of occluding and releasing carrier ions. Thus, a binder does not have to be mixed into the positive electrode active material layer 702. Accordingly, the amount of the positive electrode active materials in the positive electrode active material layer can be increased, which allows an increase in discharge capacity of a power storage device.

The positive electrode active material layer 702 containing such a positive electrode active material is formed over the electrolyte layer 103, and then the positive electrode current collector 701 can be formed.

Next, description is given of a method for manufacturing the positive electrode active material layer 702 containing a positive electrode active material and graphene.

Slurry containing particulate positive electrode active materials and graphene oxide is formed. Next, the slurry is applied to the positive electrode current collector 701. Then, heating is performed in a reduced atmosphere for reduction treatment so that the positive electrode active materials are baked and oxygen included in the graphene oxide is extracted to form openings in the graphene. Note that oxygen in the graphene oxide is not entirely extracted and partly remains in the graphene.

Through the above process, the positive electrode active material layer 702 can be formed to have a predetermined shape over the positive electrode current collector 701. Consequently, the positive electrode active material layer 702 has higher conductivity. Graphene oxide contains oxygen and thus is negatively charged in a polar solvent. As a result of being negatively charged, graphene oxide is dispersed. Therefore, the positive electrode active materials contained in the slurry are not easily aggregated, so that the size of the particle of the positive electrode active material can be prevented from increasing due to baking. Thus, the transfer of electrons in the positive electrode active materials is facilitated, resulting in an increase in conductivity of the positive electrode active material layer.

Instead of forming the positive electrode active material layer 702 containing a positive electrode active material over the electrolyte layer 103, and then forming the positive electrode current collector 701, the above-described stack in which the positive electrode active material layer 702 is formed over the positive electrode current collector 701 may be attached over the electrolyte layer 103.

This embodiment can be combined with any of the other embodiments as appropriate.

Embodiment 8

In this embodiment, an example of an electronic appliance having a curved surface in which the power storage device of one embodiment of the present invention is used is described with reference to FIGS. 16A and 16B.

Figure 16A:
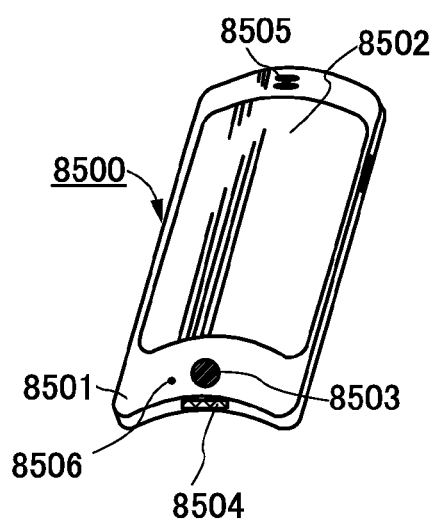
FIGS. 16A and 16B are views of electronic appliances each equipped with a power storage device of the present invention.

FIG. 16A illustrates an example of a mobile phone. A mobile phone 8500 includes a display portion 8502 incorporated in a housing 8501, an operation button 8503, an external connection port 8504, a speaker 8505, a microphone 8506, and the like. The mobile phone 8500 also includes the power storage device of one embodiment of the present invention.

When the display portion 8502 of the mobile phone 8500 illustrated in FIG. 16A is touched with a finger or the like, data can be input into the mobile phone 8500. Further, operations such as making a call and inputting text can be performed by touching the display portion 8502 with a finger or the like.

With the operation button 8503, the power can be turned on or off. In addition, types of images displayed on the display portion 8502 can be switched; switching images from a mail creation screen to a main menu screen.

The mobile phone 8500 in this embodiment includes the flexible power storage device of one embodiment of the present invention. Thus, the mobile phone can be thin and have a curved shape.

Figure 16B:
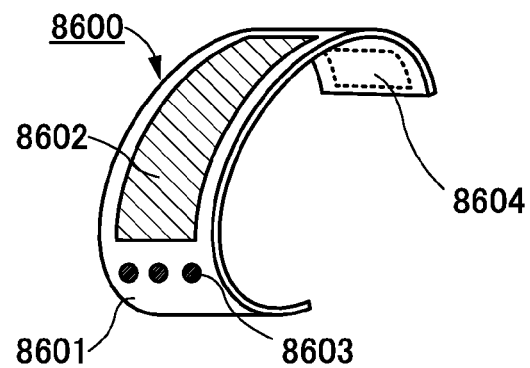

FIG. 16B is an example of a wristband-type display device. A portable display device 8600 includes a housing 8601, a display portion 8602, an operation button 8603, and a sending and receiving device 8604. The portable display device 8600 also includes the power storage device of one embodiment of the present invention.

The portable display device 8600 can receive a video signal with the sending and receiving device 8604 and can display the received video on the display portion 8602. In addition, with the sending and receiving device 8604, the portable display device 8600 can send an audio signal to another receiving appliance.

With the operation button 8603, turning on and off the power, switching displayed videos, adjusting volume, and the like can be performed.

The portable display device 8600 in this embodiment includes the flexible power storage device of one embodiment of the present invention. Thus, the portable display device which is thin and has a curved surface can be formed.

Note that it is needless to say that one embodiment of the present invention is not limited to the electronic appliances described above as long as the power storage device of one embodiment of the present invention is included.

This embodiment can be combined with any of the other embodiments as appropriate.

Embodiment 9

A power storage device of one embodiment of the present invention can be used for power sources of a variety of electrical appliances which are driven by power.

Specific examples of electrical appliances using the power storage device of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable compact disc (CD) players, radio receivers, tape recorders, headphone stereos, stereos, table clocks, wall clocks, cordless phone handsets, transceivers, portable wireless devices, mobile phones, car phones, portable game machines, toy, calculators, portable information terminals, electronic notebooks, e-book readers, electronic translators, audio input devices, video cameras, still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools, smoke detectors, and medical equipment such as dialyzers. The examples also include industrial equipment such as guide lights, traffic lights, belt conveyors, elevators, escalators, industrial robots, power storage systems, and power storage devices for leveling the amount of power supply and smart grid. In addition, moving objects driven by an electric motor using power from a power storage device are also included in the category of the electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the above electrical appliances, the power storage device of one embodiment of the present invention can be used as a main power source for supplying enough electric power for almost the whole power consumption. Alternatively, in the above electrical appliances, the power storage device of one embodiment of the present invention can be used as an uninterruptible power source which can supply power to the electrical appliances when the supply of power from the main power source or a commercial power source is stopped. Still alternatively, in the above electrical appliances, the power storage device of one embodiment of the present invention can be used as an auxiliary power source for supplying power to the electrical appliances at the same time as the power supply from the main power source or a commercial power source.

Figure 17:
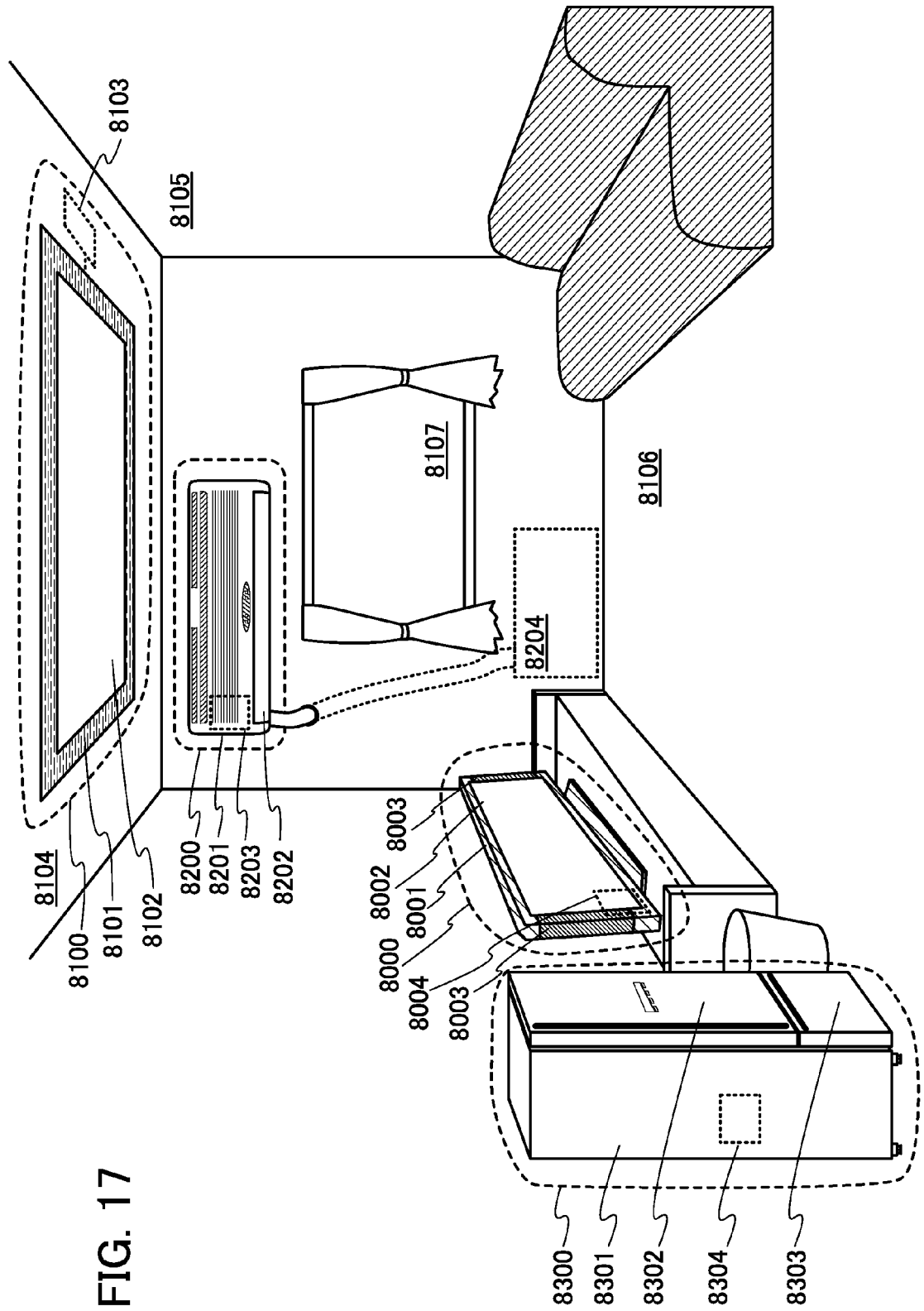
FIG. 17 is a view of electrical appliances each equipped with a power storage device of the present invention.

FIG. 17 illustrates specific structures of the electrical appliances. In FIG. 17, a display device 8000 is an example of an electrical appliance using a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive power from a commercial power source. Alternatively, the display device 8000 can use power stored in the power storage device 8004. Thus, the display device 8000 can be operated with the use of the power storage device 8004 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like, in addition to TV broadcast reception. The power storage device of one embodiment of the present invention can be used for display devices particularly for displaying information which are thin and have curved surfaces, owing to their thinness and flexibility.

In FIG. 17, an installation lighting device 8100 is an example of an electrical appliance using a power storage device 8103 of one embodiment of the present invention. Specifically, the installation lighting device 8100 includes a housing 8101, a light source 8102, the power storage device 8103, and the like. Although FIG. 17 illustrates the case where the power storage device 8103 is provided in a ceiling 8104 on which the housing 8101 and the light source 8102 are installed, the power storage device 8103 may be provided in the housing 8101. Particularly in the case where the installation lighting device 8100 is thin and has a curved surface, the power storage device of one embodiment of the present invention is suitable for the installation lighting device 8100. The installation lighting device 8100 can receive power from a commercial power source. Alternatively, the installation lighting device 8100 can use power stored in the power storage device 8103. Thus, the installation lighting device 8100 can be operated with the use of the power storage device 8103 of one embodiment of the present invention as an uninterruptible power source even when power cannot be supplied from a commercial power source due to power failure or the like.

Note that although the installation lighting device 8100 provided in the ceiling 8104 is illustrated in FIG. 17 as an example, the power storage device of one embodiment of the present invention can be used as an installation lighting device provided in, for example, a wall 8105, a floor 8106, a window 8107, or the like other than the ceiling 8104. Alternatively, the power storage device can be used in a tabletop lighting device or the like.

As the light source 8102, an artificial light source which emits light artificially by using power can be used. Specifically, an incandescent lamp, a discharge lamp such as a fluorescent lamp, and a light-emitting element such as an LED and an organic EL element are given as examples of the artificial light source.

In FIG. 17, an air conditioner including an indoor unit 8200 and an outdoor unit 8204 is an example of an electrical appliance using a power storage device 8203 of one embodiment of the present invention. Specifically, the indoor unit 8200 includes a housing 8201, an air outlet 8202, the power storage device 8203, and the like. Although FIG. 17 illustrates the case where the power storage device 8203 is provided in the indoor unit 8200, the power storage device 8203 may be provided in the outdoor unit 8204. Alternatively, the power storage device 8203 may be provided in both the indoor unit 8200 and the outdoor unit 8204. The air conditioner can receive power from a commercial power source. Alternatively, the air conditioner can use power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power source even when power cannot be supplied from a commercial power source due to power failure or the like.

Note that although the split-type air conditioner including the indoor unit and the outdoor unit is illustrated in FIG. 17 as an example, the power storage device of one embodiment of the present invention can be used in an air conditioner in which the functions of an indoor unit and an outdoor unit are integrated in one housing.

In FIG. 17, an electric refrigerator-freezer 8300 is an example of an electrical appliance using a power storage device 8304 of one embodiment of the present invention. Specifically, the electric refrigerator-freezer 8300 includes a housing 8301, a door for a refrigerator 8302, a door for a freezer 8303, the power storage device 8304, and the like. The power storage device 8304 is provided inside the housing 8301 in FIG. 17. The electric refrigerator-freezer 8300 can receive power from a commercial power source. Alternatively, the electric refrigerator-freezer 8300 can use power stored in the power storage device 8304. Thus, the electric refrigerator-freezer 8300 can be operated with the use of the power storage device 8304 of one embodiment of the present invention as an uninterruptible power source even when power cannot be supplied from a commercial power source due to power failure or the like.

Note that among the electrical appliances described above, a high-frequency heating apparatus such as a microwave oven and an electrical appliance such as an electric rice cooker require high power in a short time. The tripping of a circuit breaker of a commercial power source in use of electrical appliances can be prevented by using the power storage device of one embodiment of the present invention as an auxiliary power source for supplying power which cannot be supplied enough by a commercial power source.

In addition, in a time period when electrical appliances are not used, particularly when the proportion of the amount of power which is actually used to the total amount of power which can be supplied from a commercial power source (such a proportion referred to as a usage rate of power) is low, power can be stored in the power storage device, whereby the usage rate of power can be reduced in a time period when the electrical appliances are used. For example, in the case of the electric refrigerator-freezer 8300, power can be stored in the power storage device 8304 in night time when the temperature is low and the door for a refrigerator 8302 and the door for a freezer 8303 are not often opened and closed. On the other hand, in daytime when the temperature is high and the door for a refrigerator 8302 and the door for a freezer 8303 are frequently opened and closed, the power storage device 8304 is used as an auxiliary power source; thus, the usage rate of power in daytime can be reduced.

This embodiment can be combined with any of the other embodiments as appropriate.

Example 1

In this example, a sample in which 200-nm-thick amorphous silicon 502 is formed over a titanium sheet 501 was prepared. The amorphous silicon was formed by CVD using a mixed gas of $SiH_4$ and $PH_3$ (the flow rate was 60 sccm) and hydrogen (the flow rate was 20 sccm). The pressure was 133 Pa, the distance between substrates was 20 mm, and the substrate temperature was 280° C. Then, the sample was subjected to heat treatment at 700° C. in vacuum for 6 hours. The results of the sample are described.

Figure 11A:
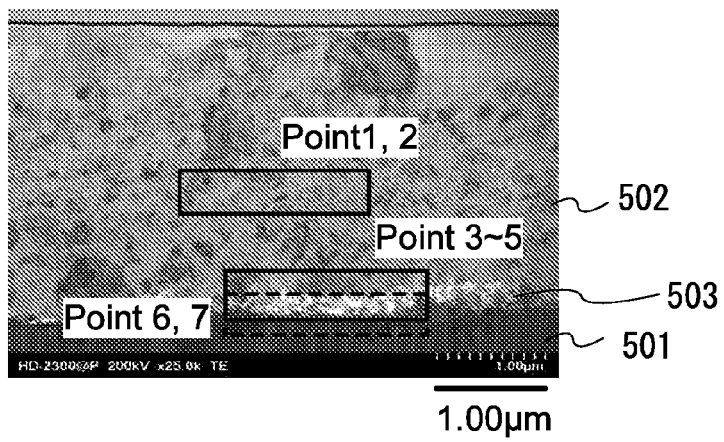
Figure 11A:
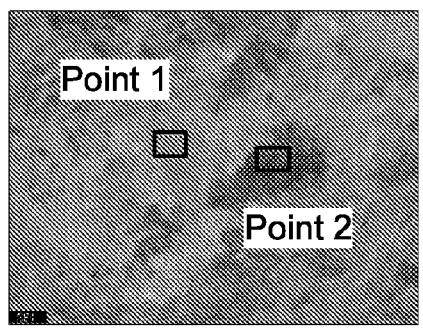
Figure 11A:
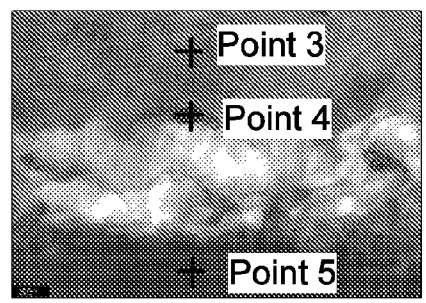
Figure 11A:
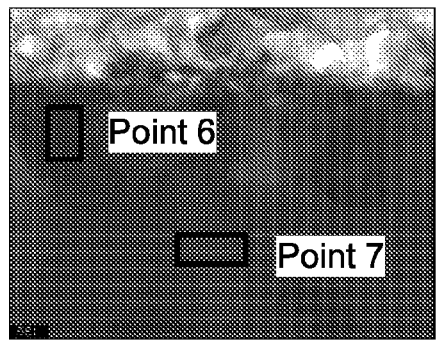

FIG. 11A shows a TEM image of the above sample. A reaction layer 503 can be observed between the titanium sheet 501 and the amorphous silicon 502.

Figure 20A:
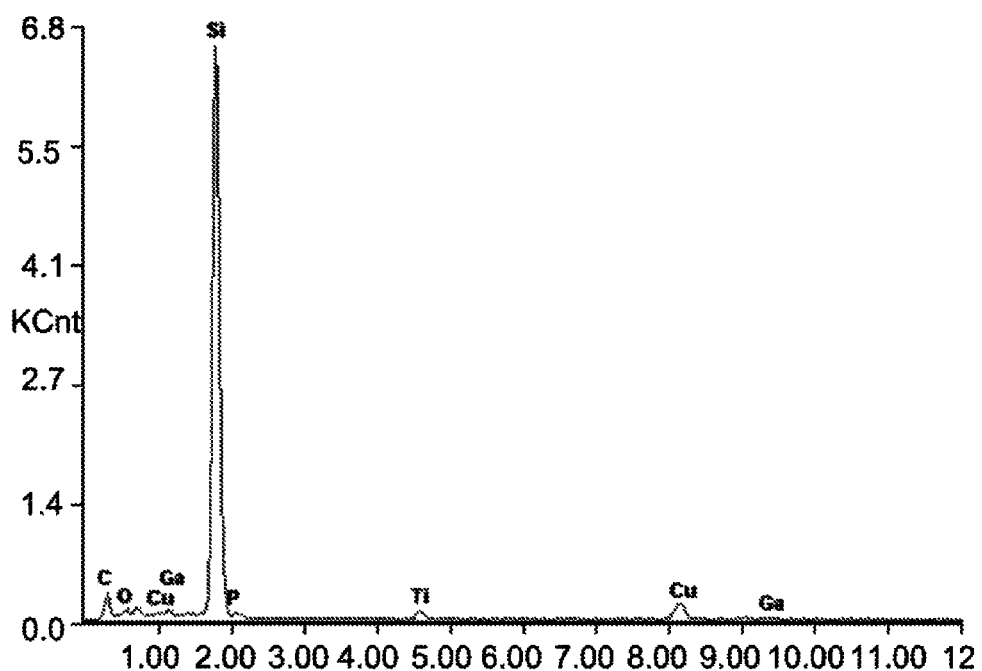
FIGS. 20A and 20B are graphs of the first experimental result.
Figure 20B:
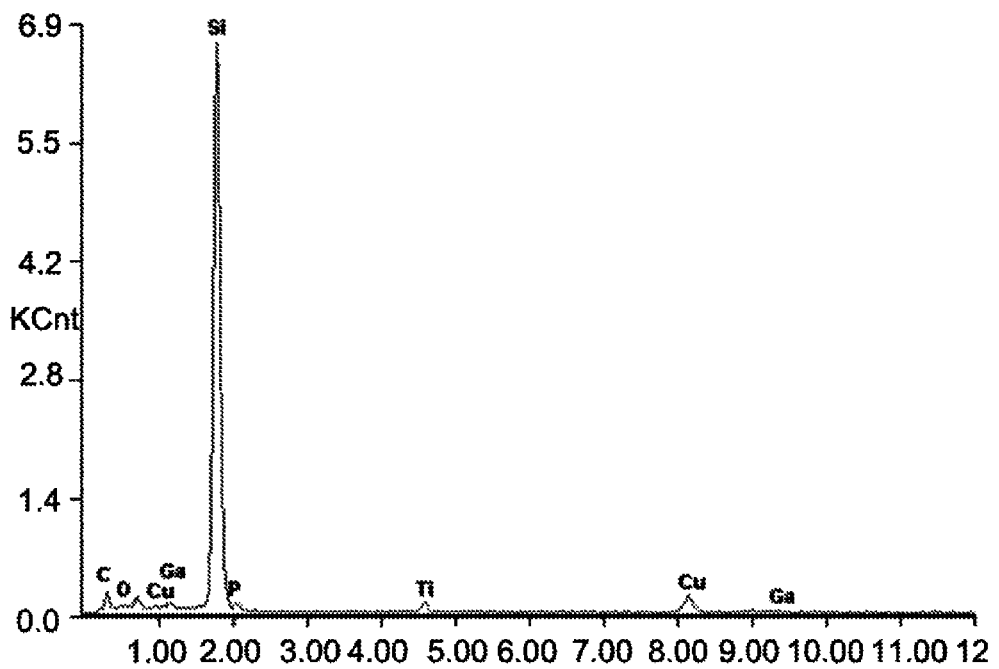

Points 1 and 2 in the amorphous silicon 502 shown in FIG. 11B-1 were measured by energy dispersive X-ray spectroscopy (EDX). The results are shown in FIGS. 20A and 20B. The x-axis represents detected elements, and the y-axis represents the strengths of the detected elements. The peak of silicon can be observed in each of Points 1 and 2. It seems that titanium has a small peak because of titanium in the titanium sheet 501.

Figure 21A:
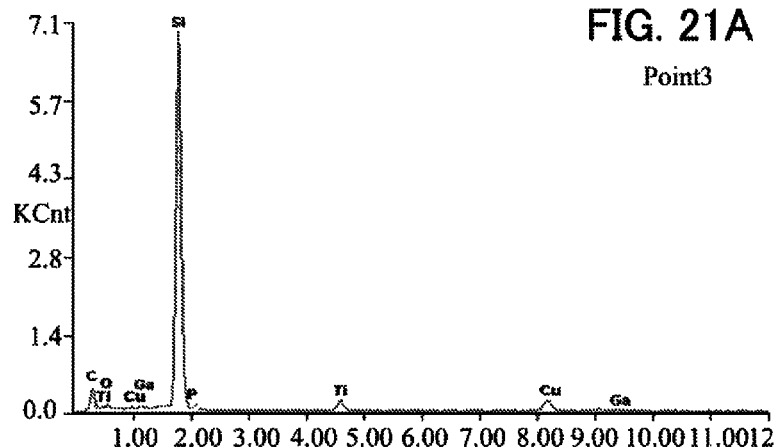
FIGS. 21A to 21C are graphs of the first experimental result.
Figure 21B:
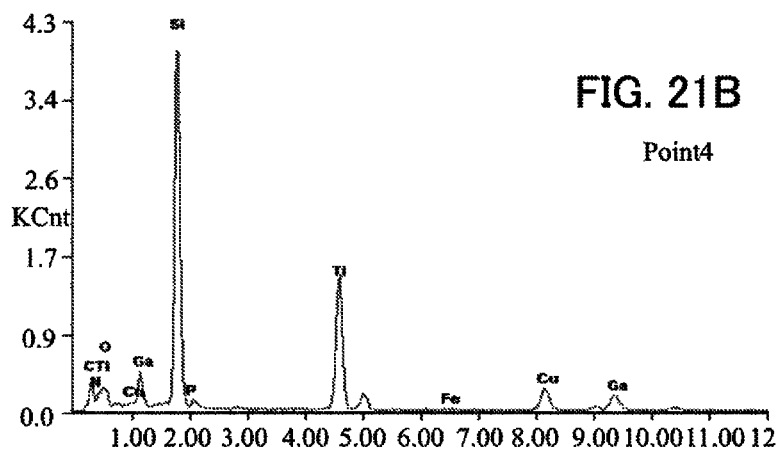
Figure 21C:
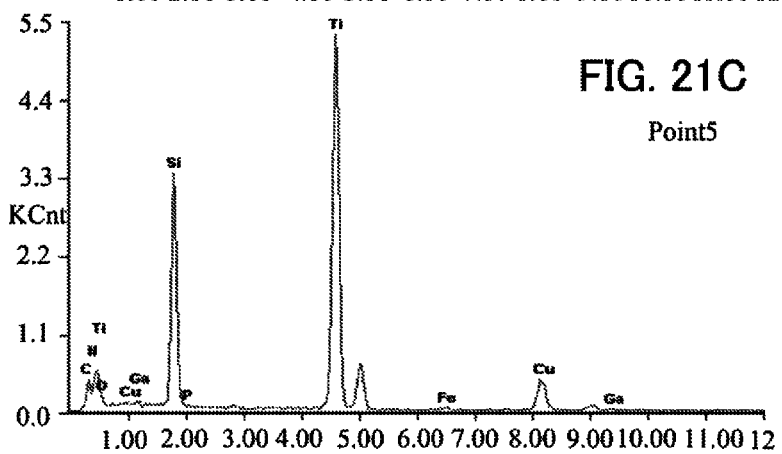

Points 3, 4, and 5 in the reaction layer 503 shown in FIG. 11B-2 were measured by EDX. The results are shown in FIGS. 21A to 21C. The x-axis represents detected elements, and the y-axis represents the strengths of the detected elements. The peak of silicon can be observed in Point 3, and the peak of titanium can be observed in addition to the peak of silicon in each of Points 4 and 5. As seen from the above, a titanium silicide layer is formed in the reaction layer 503, and the proportion of titanium gradually increases as Points are close to the titanium sheet 501.

In the vicinity of Point 4 in the reaction layer 503, a region where the contrast is different from those of Points 3 and 5 can be observed. This shows that a space is formed.

Figure 22A:
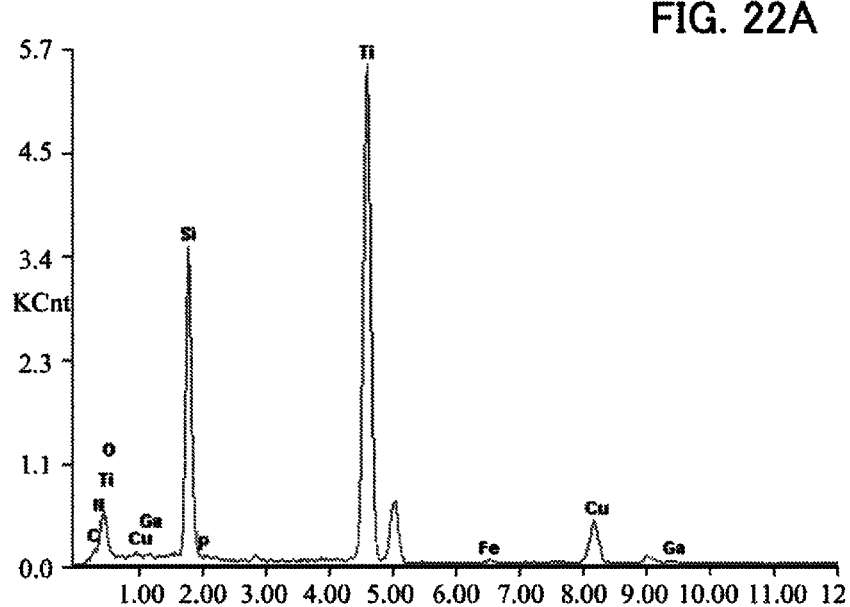
FIGS. 22A and 22B are graphs of the first experimental result.
Figure 22B:
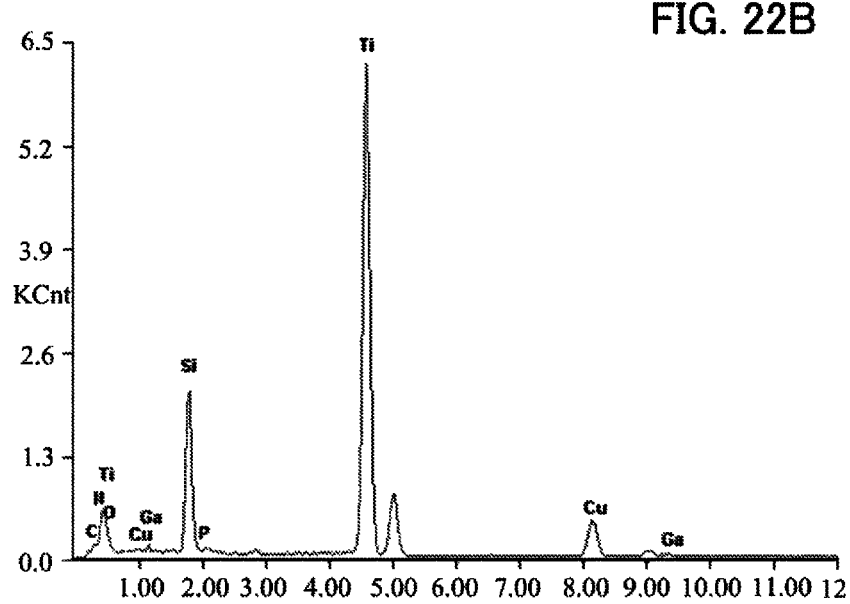

Points 6 and 7 in the titanium sheet 501 shown in FIG. 11B-3 were measured by EDX. The results are shown in FIGS. 22A and 22B. The x-axis represents detected elements, and the y-axis represents the strengths of the detected elements. The peaks of titanium and silicon can be observed in each of Points 6 and 7. It is probable that silicon diffuses to the titanium sheet 501.

In consideration of silicon which is used in the formation of titanium silicide or diffused even to the titanium sheet, it is probable that the amount of silicon is decreased and a low density layer is formed in the amorphous silicon 502. Therefore, separation can be performed with the use of the state of the low density layer and the reaction layer.

Example 2

In this example, the results of performing heat treatment on a whisker-like silicon film formed over a titanium sheet at 800° C. in a vacuum are described.

Figure 12A:
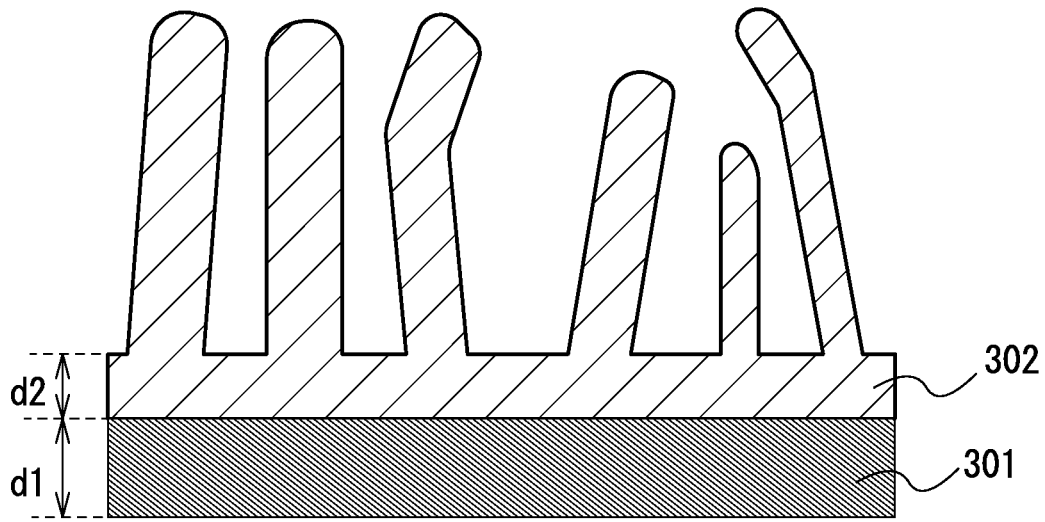
FIGS. 12A and 12B are views of a second experimental sample.

As illustrated in FIG. 12A, a whisker-like silicon film 302 was formed over a titanium sheet 301. The thickness (d1) of the titanium sheet 301 was 100 μm, and the thickness (d2) of a portion of the whisker-like silicon film which is in a film form was 500 nm. The whisker-like silicon film 302 was amorphous.

Figure 12B:
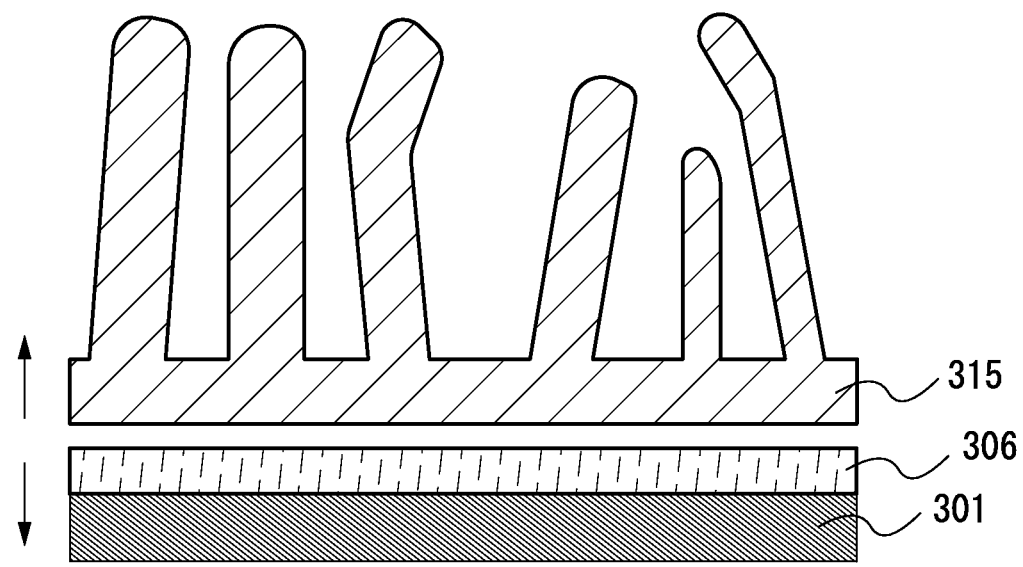

Then, heat treatment was performed at 800° C. in vacuum for 2 hours. Thus, a reaction layer 306 was formed in a region between the titanium sheet and the whisker-like silicon as illustrated in FIG. 12B. The reaction layer was titanium silicide. In addition, the whisker-like silicon was crystallized to be a polycrystalline silicon whisker 315. Separation occurs at the reaction layer 306 as a boundary. FIG. 12B illustrates an example of separating the silicon whisker 315 at the surface of the reaction layer 306.

Figure 13:
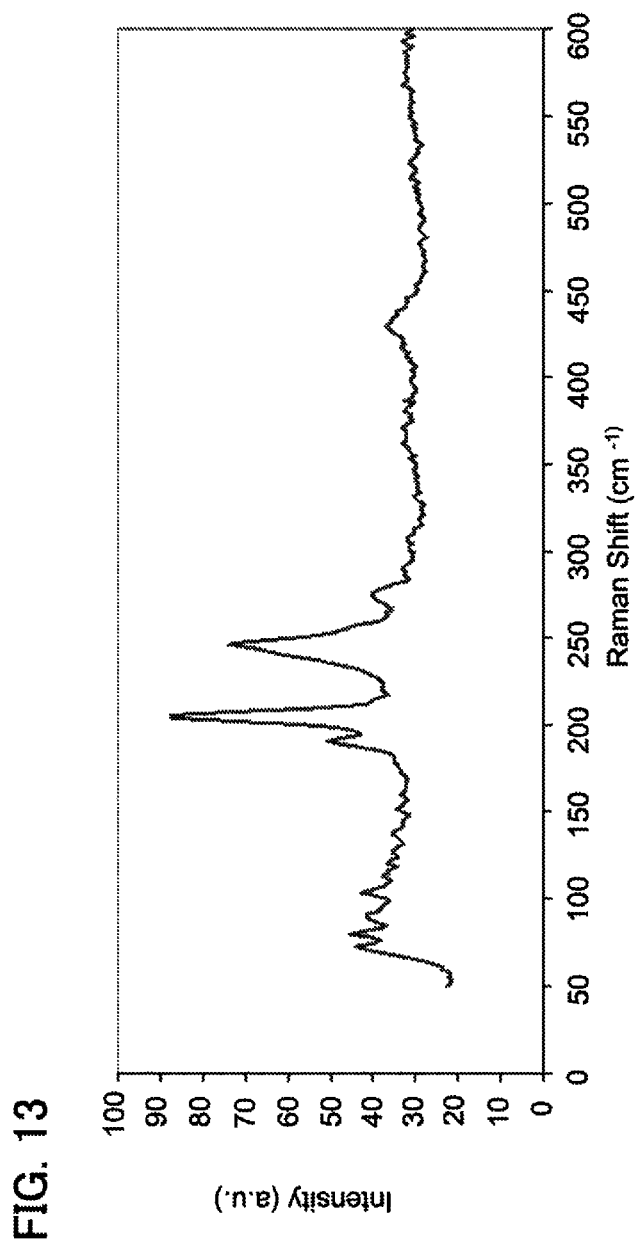
FIG. 13 is a graph of the first experimental result.

FIG. 13 shows Raman scattering spectrum of the titanium silicide after separation. The x-axis represents a wavelength and the y-axis represents a scattering intensity. The peaks of titanium silicide having a C54 structure can be confirmed around 200 cm$^{-1}$ and 250 cm$^{-1}$.

Such a titanium sheet and a reaction layer such as titanium silicide can be used for separation. The shape of silicon is not limited to a film, and the surface of the silicon may be a whisker-like surface. After the separation, the silicon can be transferred to a flexible substrate. Thus, a power storage device including the flexible substrate can be provided. This enables the power storage device to be reduced in weight.

In the case of using whisker-like silicon as a negative electrode active material, an electrolyte layer may be a solid electrolyte layer or may contain a non-aqueous electrolyte solution. That is, with the use of the separation of one embodiment of the present invention, a power storage device including a flexible substrate can be provided, and the power storage device may include a solid electrolyte layer or a non-aqueous electrolyte solution as an electrolyte layer. Note that the solid electrolyte layer is preferably used, in which case the electrolyte layer is less likely to leak than in the case of the electrolyte solution when the flexibility of the power storage device is high.

This application is based on Japanese Patent Application serial No. 2012-067634 filed with Japan Patent Office on Mar. 23, 2012, the entire contents of which are hereby incorporated by reference.

What is claimed is:

1. A method for manufacturing a power storage device, comprising the steps of:
   forming a negative electrode active material layer over a metal sheet;
   forming an electrolyte layer over the negative electrode active material layer;
   forming a positive electrode active material layer over the electrolyte layer;
   forming a positive electrode current collector over the positive electrode active material layer;
   heating the negative electrode active material layer and the metal sheet;
   separating the metal sheet from the negative electrode active material layer; and
   forming a negative electrode current collector on a surface of the negative electrode active material layer from which the metal sheet is separated.

2. The method for manufacturing a power storage device according to claim 1,
   wherein the negative electrode current collector has a thickness of more than or equal to 10 nm and less than or equal to 1 μm.

3. The method for manufacturing a power storage device according to claim 1,
   wherein the negative electrode active material layer is a silicon film.

4. The method for manufacturing a power storage device according to claim 3,
   wherein the silicon film comprises a whisker-like surface.

5. The method for manufacturing a power storage device according to claim 1,
   wherein a material of the negative electrode current collector is different from a material of the metal sheet.

6. The method for manufacturing a power storage device according to claim 1,
   wherein the negative electrode current collector comprises any one of aluminum, stainless steel, nickel, copper, tin, niobium, iron, and titanium.

7. The method for manufacturing a power storage device according to claim 1,
   wherein the electrolyte layer comprises an inorganic solid electrolyte layer or an organic solid electrolyte layer.

8. The method for manufacturing a power storage device according to claim 1,
   wherein the positive electrode active material layer comprises any one of $LiFePO_4$, $LiNiPO_4$, $LiCoPO_4$, and $LiMnPO_4$.

9. The method for manufacturing a power storage device according to claim 1,
   wherein the negative electrode current collector, the negative electrode active material layer, the electrolyte layer, the positive electrode active material layer, and the positive electrode current collector are covered with a protective film.

10. The method for manufacturing a power storage device according to claim 1, further comprising a step of fixing a resin substrate to the positive electrode current collector.

11. A method for manufacturing a power storage device, comprising the steps of:
forming a negative electrode active material layer over a metal sheet;
forming an electrolyte layer over the negative electrode active material layer;
forming a positive electrode active material layer over the electrolyte layer;
forming a positive electrode current collector over the positive electrode active material layer;
forming a protective film over the positive electrode current collector;
heating the negative electrode active material layer and the metal sheet;
separating the metal sheet from the negative electrode active material layer; and
forming a negative electrode current collector on a surface of the negative electrode active material layer from which the metal sheet is separated.

12. The method for manufacturing a power storage device according to claim 11,
wherein the negative electrode current collector has a thickness of more than or equal to 10 nm and less than or equal to 1 µm.

13. The method for manufacturing a power storage device according to claim 11,
wherein the negative electrode active material layer is a silicon film.

14. The method for manufacturing a power storage device according to claim 13,
wherein the silicon film comprises a whisker-like surface.

15. The method for manufacturing a power storage device according to claim 11,
wherein a material of the negative electrode current collector is different from a material of the metal sheet.

16. The method for manufacturing a power storage device according to claim 11,
wherein the negative electrode current collector comprises any one of aluminum, stainless steel, nickel, copper, tin, niobium, iron, and titanium.

17. The method for manufacturing a power storage device according to claim 11,
wherein the electrolyte layer comprises an inorganic solid electrolyte layer or an organic solid electrolyte layer.

18. The method for manufacturing a power storage device according to claim 11,
wherein the positive electrode active material layer comprises any one of $LiFePO_4$, $LiNiPO_4$, $LiCoPO_4$, and $LiMnPO_4$.

* * * * *